US010698402B2

(12) United States Patent
Kosa et al.

(10) Patent No.: US 10,698,402 B2
(45) Date of Patent: Jun. 30, 2020

(54) AGRICULTURAL ROBOT

(71) Applicants: RAMOT AT TEL-AVIV UNIVERSITY LTD., Tel Aviv (IL); THE STATE OF ISRAEL, MINISTRY OF AGRICULTURE AND RURAL DEVELOPMENT, AGRICULTURAL RESEARCH ORGANIZATION (ARO) (VOLCANI CENTER), Beit-Dagan (IL)

(72) Inventors: Gabor Kosa, Modiin (IL); Avital Bechar, Mazkeret Batya (IL); Yosef Yovel, Tel Aviv (IL); Roee Finkelshtain, Yarkona (IL)

(73) Assignees: Ramot at Tel-Aviv University Ltd., Tel Aviv (IL); The State of Israel, Ministry of Agriculture and Rural Development, Agricultural Research Organization (ARO) (Volcani Center), Beit-Dagan (IL)

( * ) Notice: Subject to any disclaimer, the term of this patent is extended or adjusted under 35 U.S.C. 154(b) by 79 days.

(21) Appl. No.: 15/544,949

(22) PCT Filed: Jan. 21, 2016

(86) PCT No.: PCT/IB2016/050303
§ 371 (c)(1),
(2) Date: Jul. 20, 2017

(87) PCT Pub. No.: WO2016/116888
PCT Pub. Date: Jul. 28, 2016

(65) Prior Publication Data
US 2018/0017965 A1    Jan. 18, 2018

Related U.S. Application Data

(60) Provisional application No. 62/105,763, filed on Jan. 21, 2015.

(51) Int. Cl.
G05D 1/00 (2006.01)
A01B 69/00 (2006.01)
(Continued)

(52) U.S. Cl.
CPC ......... G05D 1/0022 (2013.01); A01B 69/004 (2013.01); A01B 79/005 (2013.01); A01D 46/30 (2013.01); G05D 1/0255 (2013.01)

(58) Field of Classification Search
CPC .. G05D 1/0022; G05D 1/0255; G05D 1/0287; G05D 2201/0201; A01B 69/004;
(Continued)

(56) References Cited

U.S. PATENT DOCUMENTS 5,410,479 A    4/1995 Coker
5,616,845 A    4/1997 Hickling et al.
(Continued)

FOREIGN PATENT DOCUMENTS

CN    102124866    7/2011
CN    103299776    9/2013
(Continued)

OTHER PUBLICATIONS

RecognisingPlants.pdf (Neil Harper, Phillip McKerrow, Recognising plants with ultrasonic sensing for mobile robot navigation, 2001, Robotics and Autonomous Systems 34 (2001), pp. 71-82 (Year: 2001).*
(Continued)

*Primary Examiner* — Bao Long T Nguyen
(74) *Attorney, Agent, or Firm* — A.C. Entis-IP Ltd.; Allan C. Entis; Kenichi N. Hartman

(57) ABSTRACT

An agricultural robot for monitoring plants in a growing site, the robot comprising: a sensor module comprising: a speaker operable to transmit a directional acoustic signal at an object; and a microphone operable to register a reflection of
(Continued)

the acoustic signal; a sound analyzer operable to time-index the reflection received by the microphone and maps a location of the object that reflected the received acoustic signal; and an autonomous mobile platform onto which the sensor module is mounted.

19 Claims, 18 Drawing Sheets

(51) Int. Cl.
*A01B 79/00* (2006.01)
*G05D 1/02* (2020.01)
*A01D 46/30* (2006.01)

(58) Field of Classification Search
CPC ..... A01B 79/005; A01B 46/30; Y10S 901/46; B25J 19/026; G05B 2219/40612; G05B 19/40543; G05B 2219/40563
USPC ......................... 701/2; 700/248, 258; 901/46; 318/568.16
See application file for complete search history.

(56) References Cited

U.S. PATENT DOCUMENTS

| | | | | |
|---|---|---|---|---|
| 6,164,223 | A * | 12/2000 | Eriksson | A01B 79/005 111/200 |
| 6,243,987 | B1 | 6/2001 | Hessel | |
| 6,671,582 | B1 * | 12/2003 | Hanley | A01B 51/02 250/339.11 |
| 8,706,362 | B2 * | 4/2014 | Anderson | F23G 5/04 701/50 |
| 2006/0213167 | A1 * | 9/2006 | Koselka | A01D 46/30 56/10.2 A |
| 2010/0193626 | A1 * | 8/2010 | Goossen | B64C 37/00 244/2 |
| 2011/0022231 | A1 | 1/2011 | Walker et al. | |
| 2011/0118926 | A1 * | 5/2011 | Peake | G05D 1/0227 701/25 |
| 2013/0184944 | A1 | 7/2013 | Missotten et al. | |
| 2014/0303814 | A1 | 10/2014 | Burema et al. | |
| 2015/0278719 | A1 * | 10/2015 | Schueller | G06Q 10/063 705/7.11 |
| 2016/0202703 | A1 * | 7/2016 | Matsubara | G05D 1/0219 701/24 |
| 2017/0273241 | A1 * | 9/2017 | Salisbury | A01D 46/005 |

FOREIGN PATENT DOCUMENTS

| | | |
|---|---|---|
| CN | 103323533 | 9/2013 |
| DE | 102008009753 | 9/2009 |
| KR | 20130048033 | 5/2013 |

OTHER PUBLICATIONS

RecognisingPlants.pdf (Neil Harper, Phillip McKerrow, Recognising plants with ultrasonic sensing for mobile robot navigation, 2001, Robotics and Autonomous Systems 34 (2001), pp. 71-82 (Year: 2001)) (Year: 2001).*
International Search Report dated Jun. 5, 2016 for PCT/IB2016/050303 filed Jan. 21, 2016.
Yovel Y, Franz Mo, Stilz P, Schnitzler H-U (2008) "Plant Classification from Bat-Like Echolocation Signals". PLoS Comput Biol 4(3): e1000032. doi:10.1371/journal.pcbi.1000032. Published Mar. 21, 2008.
Yovel Y, Stilz P, Franz Mo, Boonman A, Schnitzler H-U (2009) "What a Plant Sounds Like: The Statistics of Vegetation Echoes as Received by Echolocating Bats". PLoS Comput Biol 5(7): e1000429. doi:10.1371/journal.pcbi.1000429. Published Jul. 3, 2009.
European Search Report dated Sep. 3, 2018 for Application No. 16739863.5 filed Aug. 17, 2017.

* cited by examiner

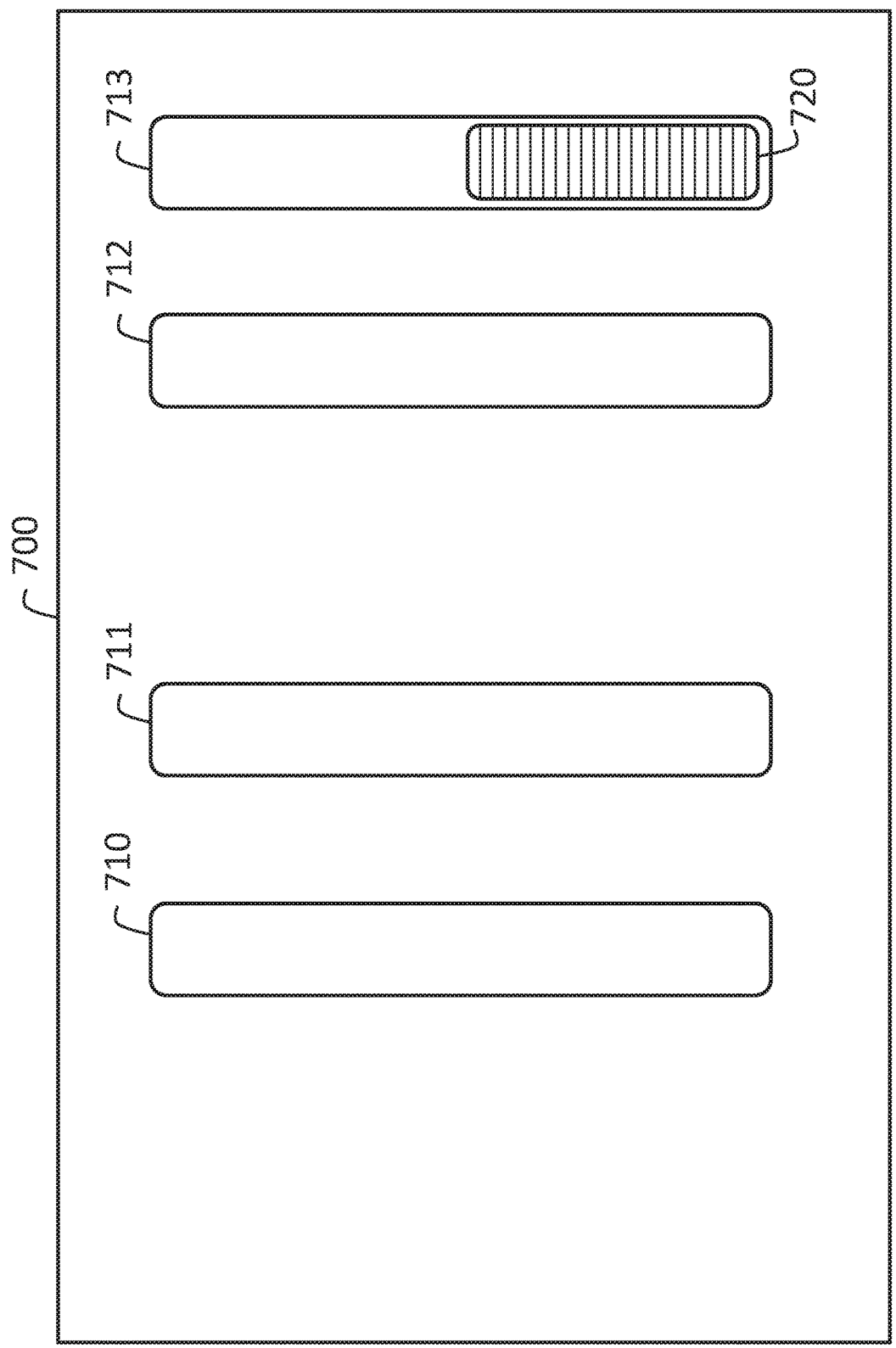

AGRICULTURAL ROBOT

RELATED APPLICATIONS

The present application is a U.S. National Phase of PCT Application No. PCT/IB2016/050303, filed on Jan. 21, 2016, which claims benefit under 35 U.S.C. 119(e) of U.S. Provisional Application 62/105,763 filed Jan. 21, 2015. The disclosures of these prior applications are incorporated herein by reference in their entirety.

TECHNICAL FIELD

Embodiments of the disclosure relate to an agricultural robot.

BACKGROUND

Modern agriculture that provides produce to feed the burgeoning global population is a complex industrial process that involves investment and management of natural and manmade resources such as land, artificial soil, water, sunlight, nutrients, and pesticides to promote plant growth that provides abundant, economic crop yields. Plant health, growth rate, and crop yields are subject to variables, such as weather, disease, and insect infestations, which may be difficult to anticipate and operate to make efficient provision and timely administration of the resources a relatively complex undertaking. Whether greenhouse, open field, or orchard agriculture, efficient and close monitoring of plant growth and health, and that of the grains, fruits, and vegetables they bear may be particularly advantageous in facilitating effective management of the resources.

SUMMARY

An aspect of an embodiment of the disclosure relates to providing an agricultural robot that is configured to navigate an agricultural growing site, such as a greenhouse, open field, or orchard, to locate and inspect plants growing at the site. In an embodiment of the disclosure the agricultural robot, hereinafter also referred to as an AGRYbot, comprises an acoustic sensor module mounted to an autonomous mobile platform, by way of example an autonomous ground vehicle or an autonomous aircraft. The acoustic sensor module comprises a speaker controllable to transmit an acoustic signal and a microphone operable to receive and register an acoustic signal.

In an embodiment of the disclosure, the speaker and microphone are controlled by a sound analyzer, which may be operable to control the speaker and microphone, as well as analyze sound registered by the microphone, in one or both of an echolocation mode and a communication mode.

In the echolocation mode, the sound analyzer is operable to control the speaker to transmit an acoustic signal comprising a broad spectrum beam of acoustic energy, optionally characterized by ultrasonic frequencies, to illuminate the growing site with acoustic energy, and analyze reflected acoustic signals that are registered by the microphone. The sound analyzer may be operable to process the reflected acoustic signal to map a planting pattern of the plants in the growing site and locate plants for inspection, as well as optionally locate other objects in the growing site. In an embodiment of the disclosure, the mobile platform is responsive to the sound analyzer to navigate the planting pattern and position the AGRYbot for advantageous inspection of the plants.

In the communication mode, the sound analyzer is operable to control the speaker to transmit acoustic communication signals to a communication partner, and process acoustic communication signals received from a communication partner by the microphone. Optionally, the acoustic communication signals comprise operational instructions for an AGRYbot or information regarding the growing site gathered by an AGRYbot. Optionally, the communication partner is another AGRYbot. Optionally, the communication partner is a central control unit operable to monitor and control one or more AGRYbots. The central control unit is optionally a computing device for use by a human user.

In an embodiment of the disclosure the sound analyzer comprises a classifier that processes the reflected acoustic signal registered by the microphone to characterize objects reflecting the acoustic signal. Optionally, the classifier is operable to identify plant structure and distinguish crop from foliage, and/or to identify features of the reflected acoustic signal that provide indication of quantity, health, and/or ripeness for harvesting, of the crop. Optionally, the classifier characterizes the detected object(s) using a machine learning method.

In an embodiment of the disclosure, the sensor module is mounted to the mobile platform, by way of example via a robotic arm, so that when the AGRYrobot is adjacent a plant intended for inspection, the sensor module can be translated and/or rotated independent of the mobile platform to facilitate illumination of the plant with the acoustic signal and reception of the acoustic signal reflected by the plant.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Unless otherwise indicated, the word "or" in the description and claims is considered to be the inclusive "or" rather than the exclusive or, and indicates at least one of, or any combination of items it conjoins.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

FIG. 10C shows a schematic illustration of a map of a plant growing area generated by a sound analyzer in accordance with an embodiment of the disclosure;

DETAILED DESCRIPTION

Figure 1A:
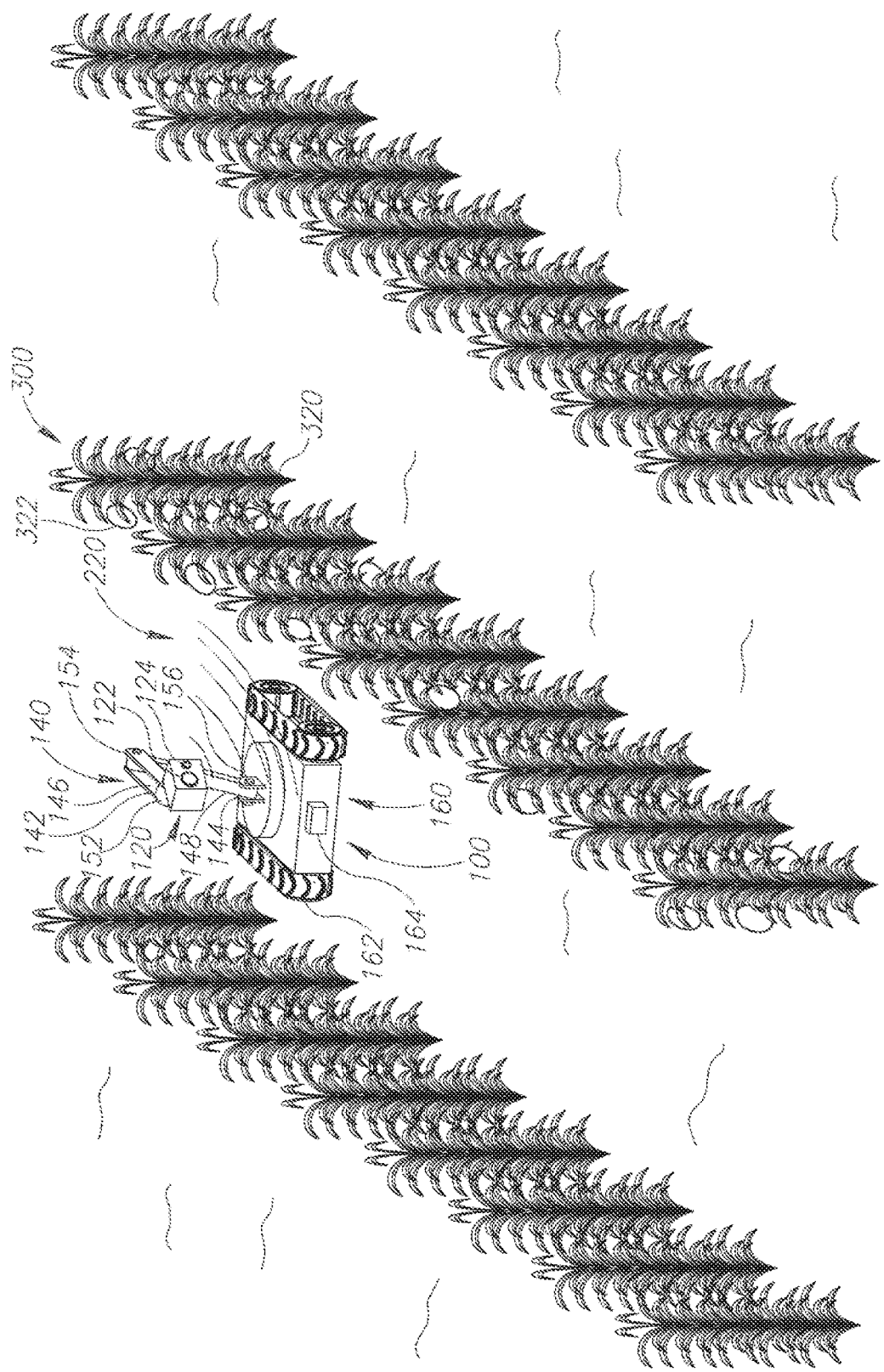
FIGS. 1A-1C show schematic illustrations of an AGRYbot in accordance with an embodiment of the disclosure in an agricultural field.
Figure 1B:
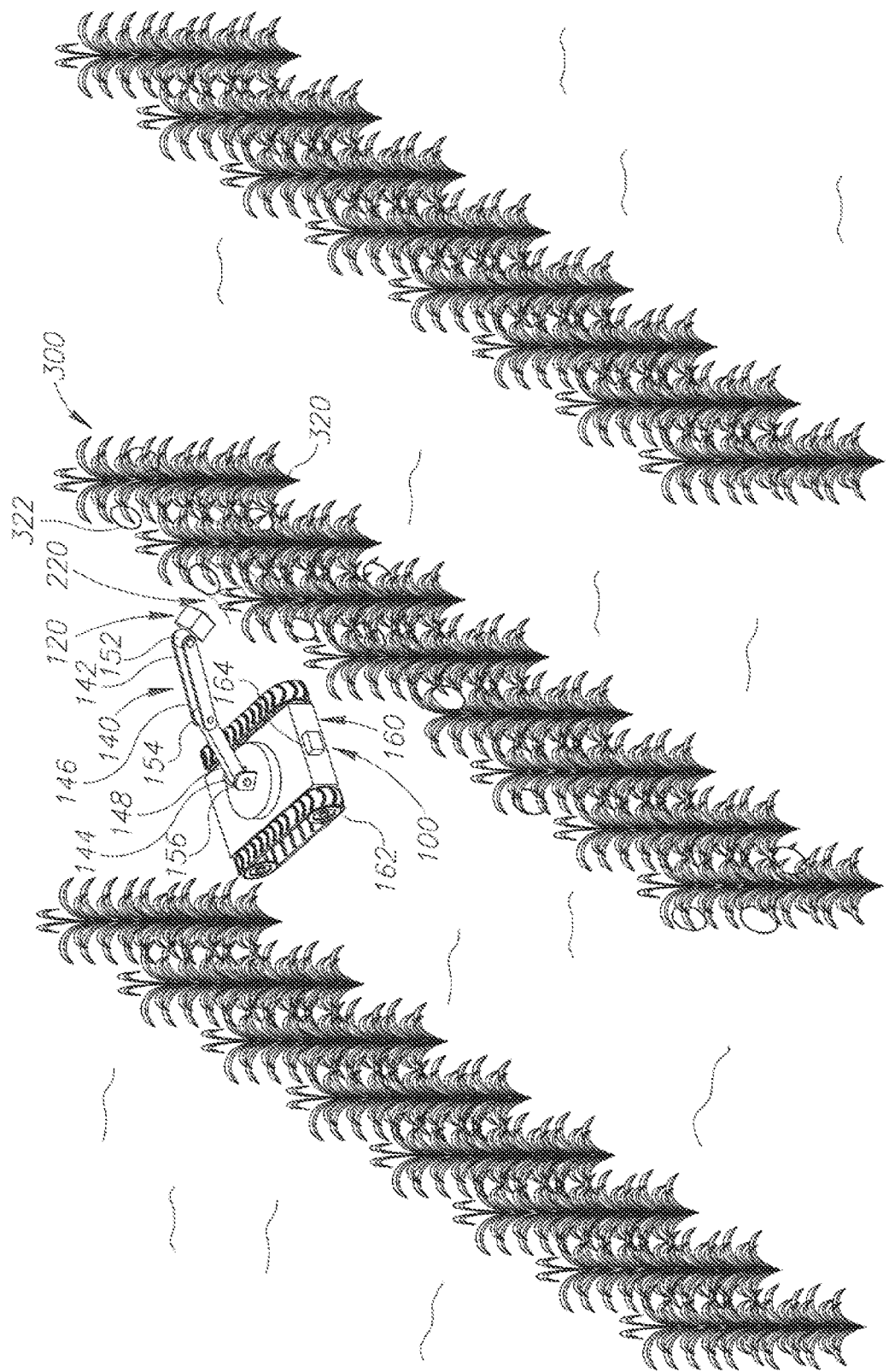

FIGS. 1A-1B schematically show an AGRYbot 100 in accordance with an embodiment of the disclosure. AGRYbot 100 comprises a sensor module 120 that is connected to an autonomous vehicle 160 via a robotic manipulator 140.

In an embodiment of the disclosure, sensor module 120 may comprise a speaker 122 and a microphone 124. Speaker 122 transmits an acoustic signal 220, and microphone 124 registers an echo 220 of acoustic signal 220 that is reflected from objects, by way of example plant row 300 comprising agricultural plants 320, which may have fruit 322, in an environment that is illuminated by the acoustic signal. Microphone 124 may comprise an analog to a digital converter (ADC; not shown) that digitizes sounds registered by the microphone.

In an embodiment of the disclosure, acoustic signal 220 is a directional signal that is gradually scattered in a cone-like pattern from speaker 122. Optionally, acoustic signal 220 is a broad spectrum "chirp signal", in which the signal's wavelength changes as a function of time. Optionally, chirp signal 220 is characterized by a descending or ascending sound frequency between about 20 kHz (kilohertz) and about 200 kHz, between about 20 kHz and about 120 kHz, or between about 15 kHz and about 90 kHz. Optionally, each chirp signal has a duration of about 2 millisecond (ms), about 5 ms, about 10 ms, about 20 ms, about 50 ms, about 75 ms or about 100 ms. Optionally, the frequency of the chirp signal changes linearly over time. Optionally, the chirp signal has constant power over time.

For convenience of presentation, the chirp signal transmitted from speaker 122 and registered by microphone 124 directly without first reflecting from objects may be referred to herein as a "transmitted chirp" and an echo of the chirp signal registered by microphone 124 after being reflected from objects in the environment may be referred to herein as a "return chirp".

Robotic manipulator 140 may comprise at least one computer-controlled actuator controlled by a controller (not shown) that provides computer-controlled movement to the robotic manipulator and thus to sensor module 120. The controller may comprise an instruction set stored in a non-transitory computer readable medium and executed by a microprocessor housed with or operatively connected to the AGRYbot. Optionally, robotic manipulator 140, as shown in FIGS. 1A-1B is an articulated robotic arm, having a distal end 142 that connects to sensor module 120 and a proximal end 144 that connects to autonomous vehicle 160. By way of example, as shown in FIGS. 1A-1B, actuators 152, 154 and 156 are placed, respectively, at a junction between distal end 142 and sensor module 120, a junction between segments 146 and 148 of robotic manipulator 140, and a junction between proximal end 144 of the robotic manipulator and autonomous vehicle 160 provide the computer-controlled movement. Optionally, robotic manipulator 140 provides six degrees of freedom (6 DOF) or at least three degrees of freedom (3 DOF) movement for sensor module 120.

Autonomous vehicle 160 may comprise a guidance system 164 that controls the movement of the autonomous vehicle. Guidance system 164 may comprise an instruction set stored in a non-transitory computer readable medium and executed by a microprocessor housed with or operatively connected to the AGRYbot. Guidance system 164 may further comprise a LADAR system (not shown) providing the guidance system with orientation and distance of objects around the AGRYbot. Alternatively or additionally, guidance system 164 may comprise a receiver for receiving information from a global navigational satellite system (GNSS; not shown), by way of example a GPS system or a GLONASS system. Alternatively or additionally, guidance system 164 may include one or a combination of two or more of: an odometer, accelerometer, and a digital compass. In an embodiment of the invention, autonomous vehicle 160 is a ground based vehicle (as shown in FIGS. 1A-1B) that optionally comprises a land-based motility means 162 which may comprise one or more of: tracks (as shown in FIGS. 1A and 1B), wheels and robotic legs. Optionally, autonomous vehicle 160 is an aerial vehicle, as described further hereinbelow with reference to an aerial vehicle 510 shown in FIG. 11).

FIG. 1B schematically shows movement of AGRYbot 100 and sensor module 120 with autonomous vehicle 160 and robotic manipulator 140, whereby sensor module 120 is moved to scan a particular plant in plant row 300 at a closer proximity.

Figure 1C:
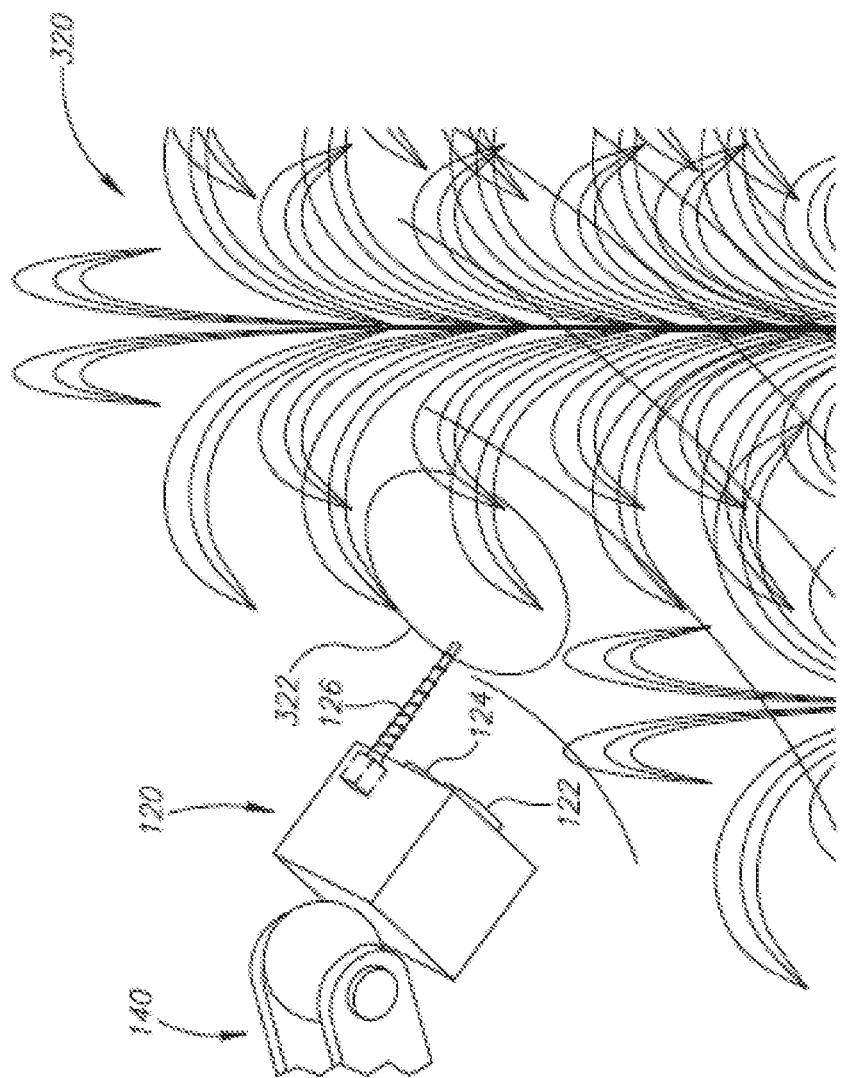

FIG. 1C schematically shows sensor module 120 positioned near fruit 322 of plant 320 to evaluate the fruit. Optionally, sensor module 120 comprises one or more additional sensors, by way of example a camera (not shown), a LADAR system (not shown), a chemical detector (an "artificial nose"; not shown) or a mechanical proboscis 126. In an embodiment of the invention, sensor module may evaluate fruit 322 to determine ripeness or readiness for harvest of the fruit. Readiness for harvest may be evaluated, by way of example, through one or a combination of methods, including: evaluating return chirps reflected from fruit 322; capturing light reflected from fruit 322 with a camera to determine its color or absorbance of one or more frequencies of light including visible light, ultraviolet or infrared light; evaluating fruit 322 with a chemical sensor that is sensitive to one or more chemicals produced and/or released by fruit 322 that indicates ripeness (by way of example nitric oxide and/or ethylene); or touching fruit 322 with proboscis 126 to evaluate, by way of example, hardness of fruit 322. Optionally, AGRYbot 100 further comprises one or more agricultural tools (not shown) that manipulate agricultural plants and/or fruits and are responsive to one or more evaluations of fruit ripeness conducted by sensor module 120. The agricultural tool may be, by way of example, a plant harvester, a fruit picker, or a pesticide sprayer.

Figure 1D:
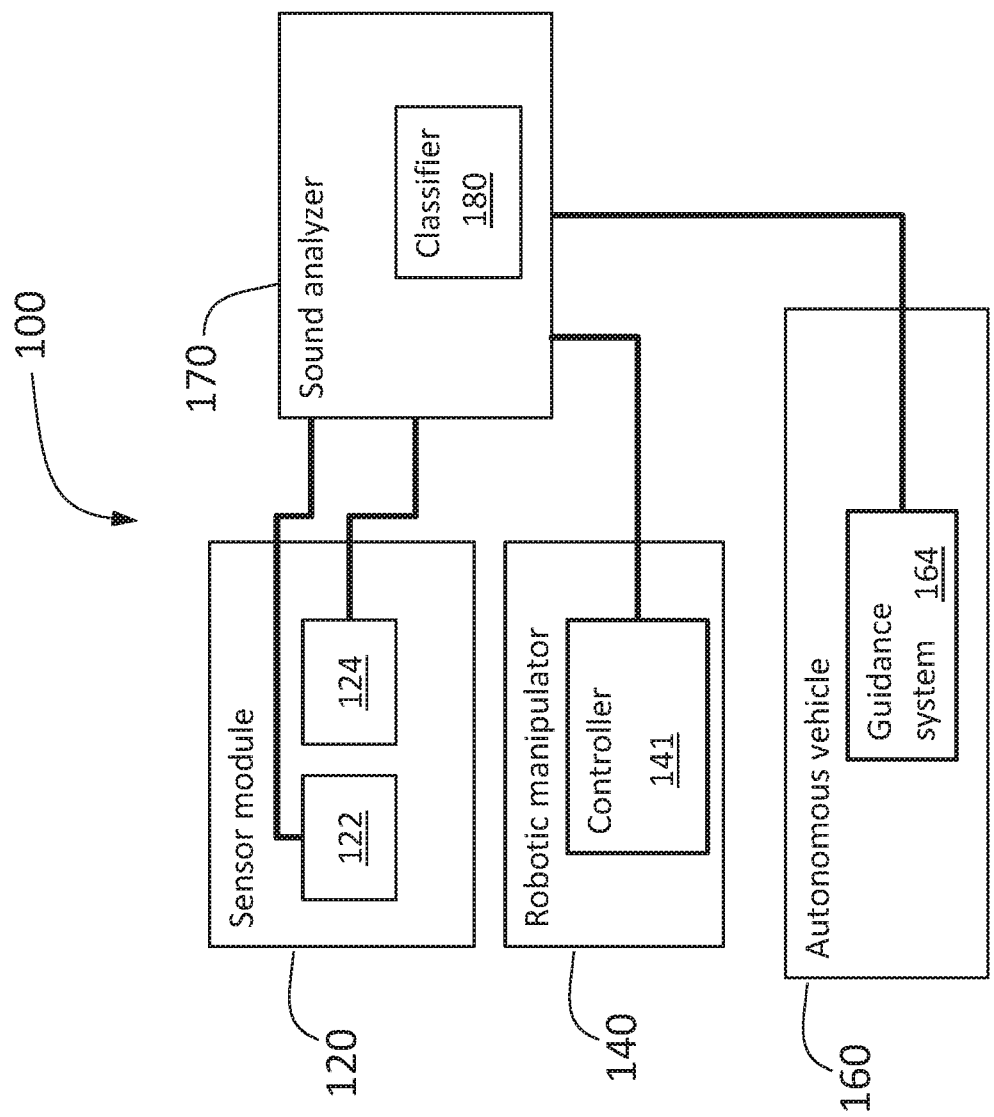
FIG. 1D shows a block diagram representing an AGRYbot in accordance with an embodiment of the disclosure.

FIG. 1D schematically shows a block diagram of AGRYbot 100 in accordance with an embodiment of the disclosure, including a selection of its components: sensor module 120 having speaker 122 and microphone 124; robotic manipulator 140 having controller 141; and autonomous vehicle 160 having guidance system 164. AGRYbot further comprises sound analyzer 170 and classifier 180.

In an embodiment of the disclosure, sound analyzer 170 may be operable to control the speaker and microphone, as well as analyze sound registered by the microphone, in one or both of an echolocation mode and a communication mode. Sound analyzer 170 may comprise an instruction set stored in a non-transitory computer readable medium and executed by a microprocessor housed with or operatively connected to the AGRYbot.

In echolocation mode, sound analyzer 170 may be operable to control speaker 122 to transmit acoustic signals to illuminate an area of the agricultural field. Sound analyzer 170 is also operable to process acoustic signals reflected from plants and other items in the agricultural fields and registered by microphone 124.

In communication mode, sound analyzer 170 may be operable to control the speaker to transmit acoustic communication signals to a communication partner, and process acoustic communication signals received from a communication partner by the microphone. In an embodiment of the disclosure, the acoustic communication signals comprise operational instructions for an AGRYbot, which may be AGRYbot 100 or another AGRYbot, or information gathered by AGRYbot 100 from a growing site. Optionally, the communication partner is another AGRYbot. Optionally, the communication partner is a central control unit 550 (shown and described with reference to FIG. 12 hereinbelow below) operable to monitor and control one or more AGRYbots. Optionally, AGRYbot 100 further comprises wireless communication means, which may include one or more of Wi-Fi, Bluetooth, and cell-phone communication.

The analysis of reflected sound in echolocation mode is described in further detail in FIGS. 2 through 10C. In an embodiment of the disclosure, Sound analyzer 170 time-indexes sounds registered by microphone 124, for example the transmitted chirp and the return chirp. The sound analyzer may separate the registered sounds according to frequency and time, so that the registered sound is converted into "pixels" of sound comprising an intensity value, a time of registration, and a frequency. The sound analyzer may analyze the registered sound, optionally the pixels of sound, to detect the presence and/or determine the distance of objects that reflected the acoustic signals transmitted by speaker 122.

Figure 2:
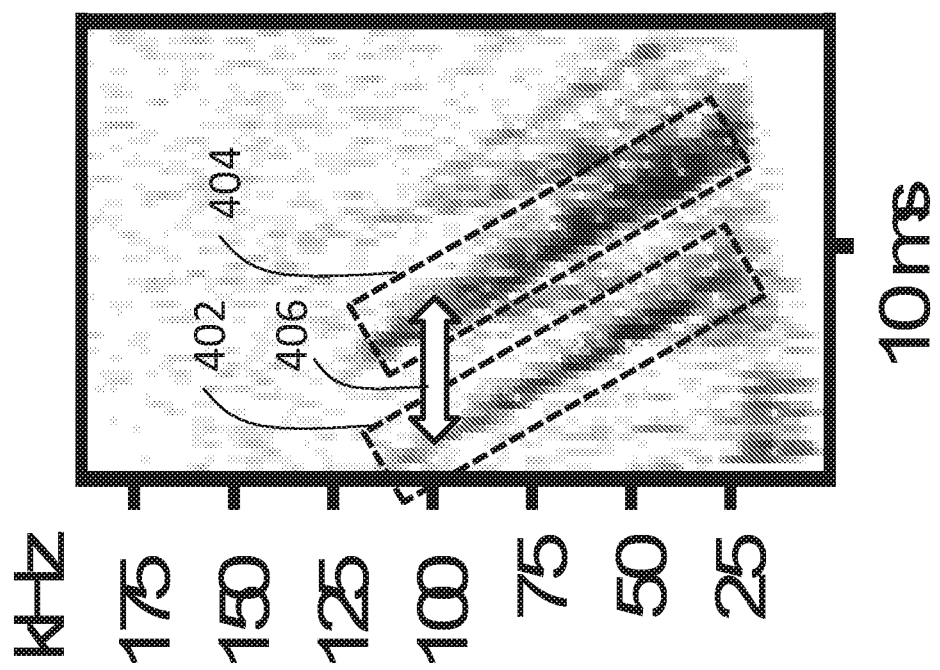
FIG. 2 shows a spectrogram of an acoustic signal and its echo registered by a microphone comprised in the AGRYbot in accordance with an embodiment of the disclosure.

FIG. 2 shows a spectrogram plotting the spectrum of frequencies in registered sound signals as it changes over time. By way of example, a 10 ms chirp signal having a linearly decreasing frequency ranging from 120 kHz to 20 kHz is transmitted from a speaker (by way of example speaker 122 shown in FIG. 1A) towards a single plant located 1.0 m (meters) from the speaker. The resulting transmitted and return chirps are registered by microphone 124 located in close proximity, by way of example between about 1 cm (centimeter) to 5 cm, to speaker 122, and the registered acoustic signal is time-indexed by the sound analyzer. Each pixel in the spectrogram shown in FIG. 2 represents an amplitude of sound registered by the microphone at a given frequency at a given time. In such a spectrogram, where the vertical y-axis represents frequency and the horizontal x-axis represents time, the transmitted and return chirps are relatively easy to detect because a chirp signal having a linearly changing frequency appears as a diagonal line. The diagonal plot within dotted rectangle 402 represents the transmitted chirp. The return chirp reflected from an object will typically be presented in the spectrogram as a series of linear plot that has substantially the same slope as the plot representing the transmitted chirp within rectangle 402, only shifted later in time. Thus, the diagonal plot within dotted rectangle 404, which has substantially the same duration and slope as the plot within rectangle 402 can be understood to represent a return chirp reflected from sound-reflecting features of the plant 1 m away from the microphone.

The difference in time ($\Delta t$) between a portion of the transmitted chirp having a given frequency (kHz) and a corresponding portion of the return chirp having the same frequency, for example as indicated by double-headed block arrow 406, is a function of the distance between the location of the microphone and the plant reflecting the chirp signal to create the return chirp. Assuming that both the speaker and microphone are at substantially the same location, $\Delta t$ can be converted into the distance ($\Delta d$) between the microphone (or speaker) and the plant in accordance with the formula:

$$\Delta d = \left(\Delta t \cdot 343 \frac{m}{s}\right) / 2 \qquad (1)$$

where $\Delta t$ is measured in seconds (s) and $\Delta d$ is provided in meters (m). This formula assumes that acoustic signal is registered by the microphone substantially instantaneously due to the close proximity between the speaker and microphone, that the speed of sound in air is 343 meters per second, and that the distance traveled by the reflected acoustic signal from the speaker to the microphone over the duration of $\Delta t$ is twice the distance between the microphone and the object that reflected the acoustic signal. Given that $\Delta d$ is 1 m, $\Delta t$ is expected according to formula (1) to be 5.8 milliseconds (ms). Indeed, as shown in FIG. 2, the $\Delta t$ indicated by doubled-headed block arrow 406 is shown to be between 5 and 6 ms.

Figure 3A:
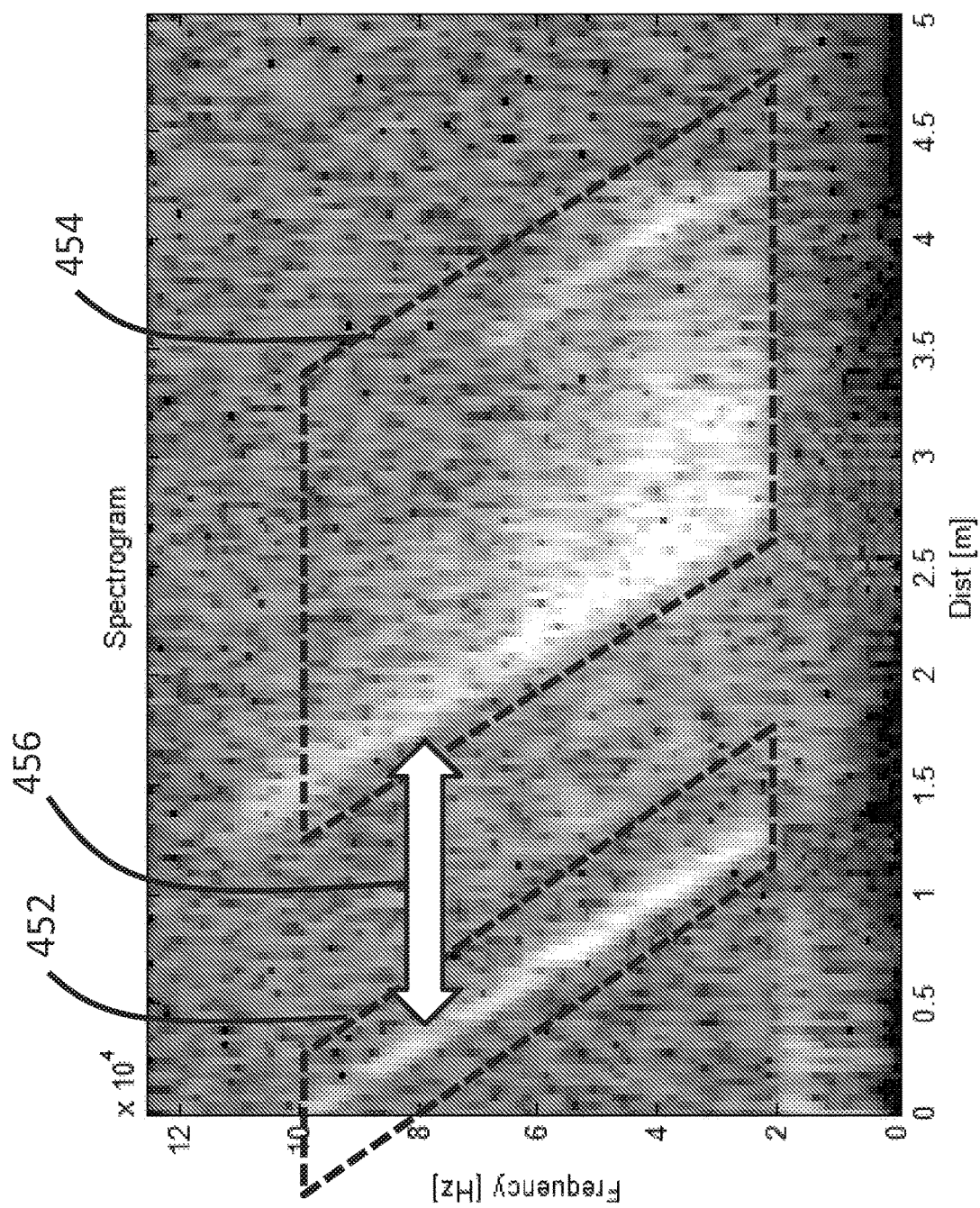
FIGS. 3A-3B show additional spectrograms of registered acoustic signals.
Figure 3B:
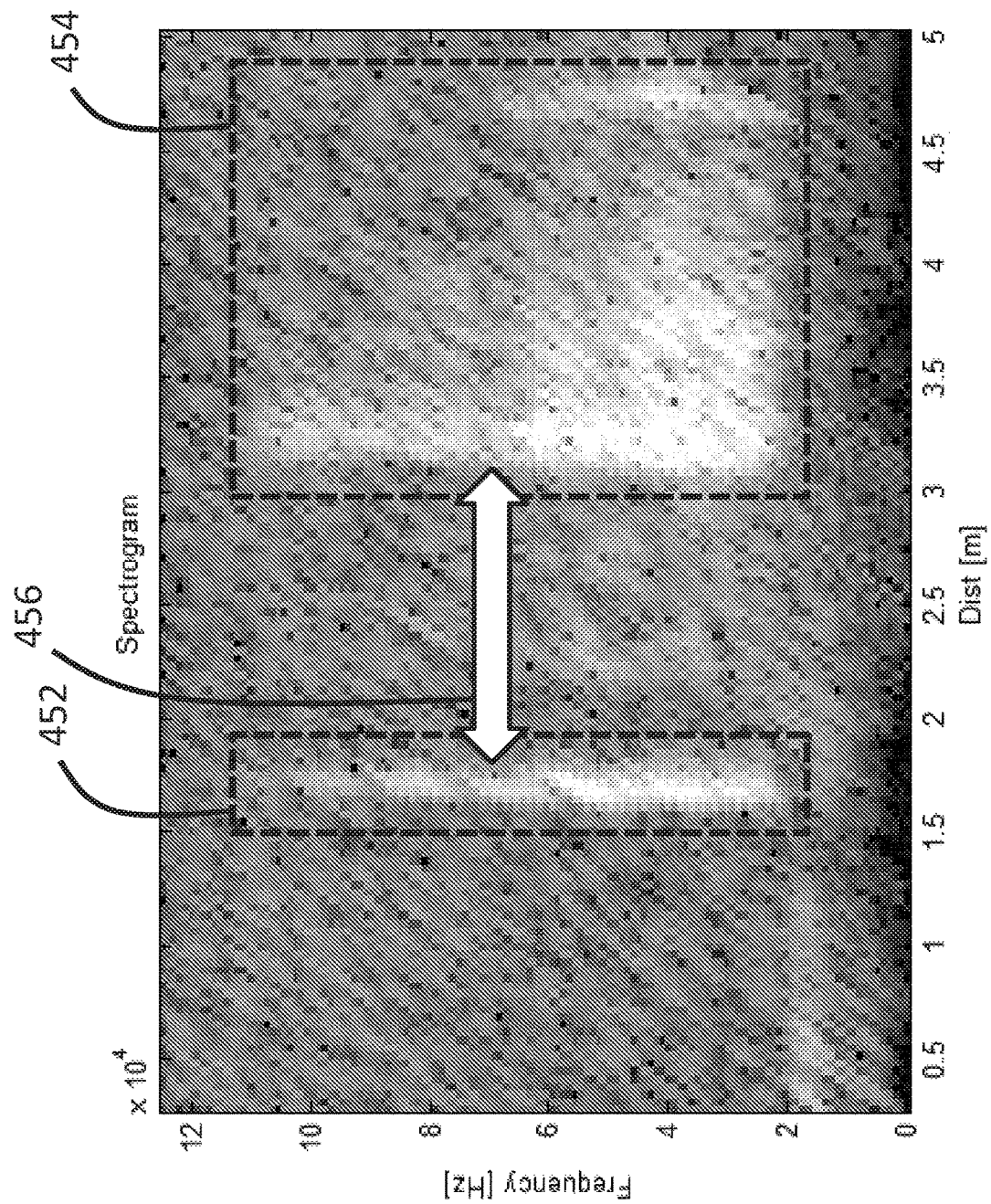

Reference is now made to FIGS. 3A and 3B. To simplify analysis of the spectrogram, the time between the transmitted and returned signal may be converted to meters according to equation (1), and the plots at each frequency may be shifted backwards in time according to the change in frequency of the transmitted chirp signal to make the plots representing the transmitted chirp and return chirps into vertical plots rather than diagonal plots. In FIG. 3A, the x-axis has been converted from time to distance according to formula (1) but the plots at each frequency have not yet been shifted backwards in time according to the frequency change of the chirp signal. As such, the plots representing the transmitted chirp, located substantially within dashed box 452, as well as the plots representing the return chirp, located substantially within dotted box 454 appear as diagonal lines. FIG. 3B shows the same spectrogram as FIG. 3A after the plots at each frequency have been "straightened", that is, shifted backwards in time according to the transmitted chirp. As such, the same plots appear as vertical lines. Such a transformation makes $\Delta d$ between the transmitted chirp and the return chirp, schematically represented as double headed block arrow 456 and representing the distance, relatively easy to discern and detect. Ad 456 is also an estimation of the distance between the microphone (for example microphone 124 shown in FIGS. 1A-1B) and an object that reflected the transmitted chirp signal to produce the return chirp.

Figure 4:
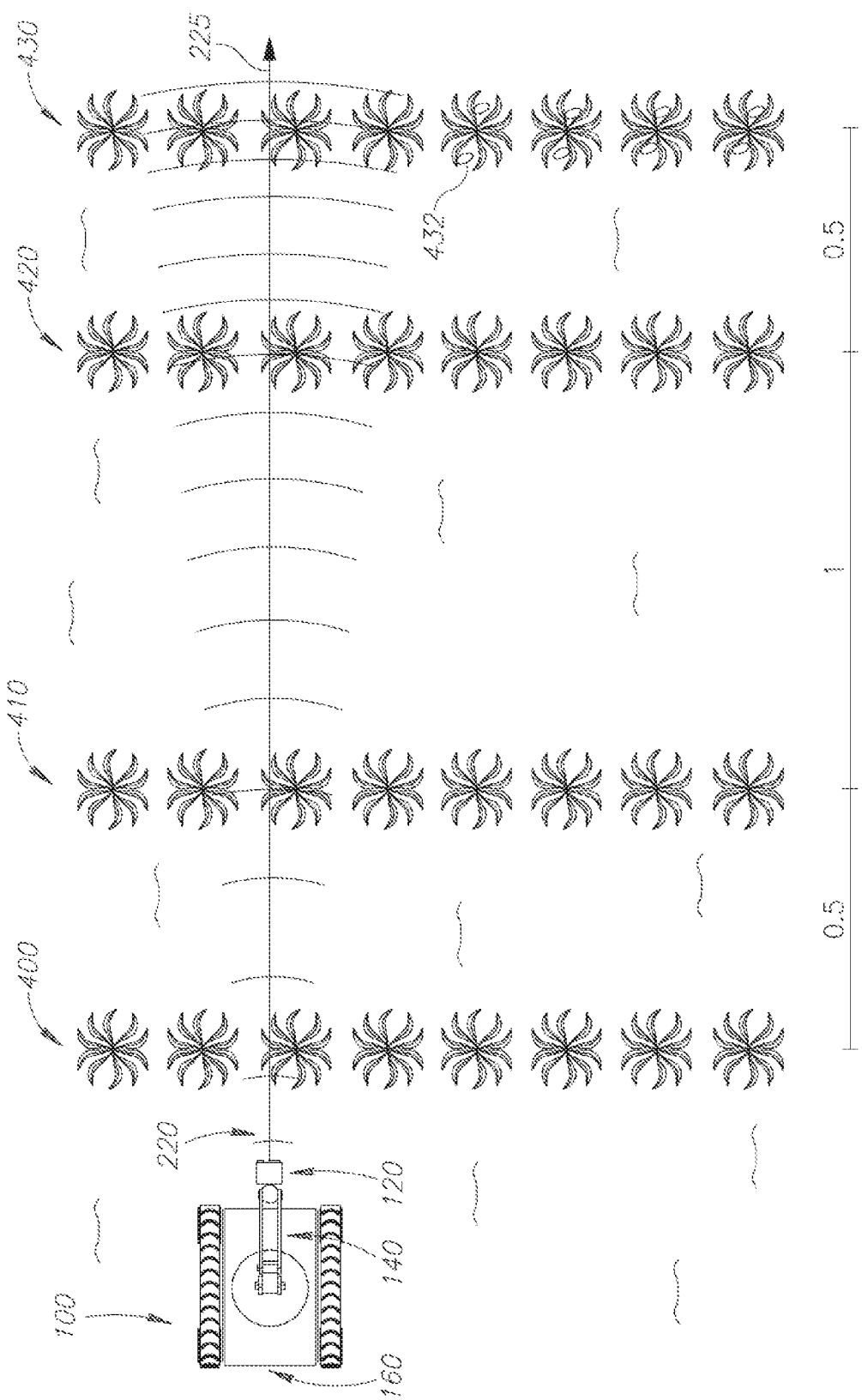
FIG. 4 shows a schematic illustration of an AGRYbot in accordance with an embodiment of the disclosure scanning an agricultural field.

Reference is now made to FIG. 4. While rows of plants growing in an agricultural field form a wall-like structure, the row is a porous structure with many gaps. In addition, sound waves that strike a plant can be reflected, absorbed, or penetrate and traverse the plant. When acoustic signal 220 is transmitted from the speaker in sensor module 120 of AGRYbot 100 to a plurality of parallel plant rows 400, 410, 420 and 430, the return chirp includes acoustic signals reflected not only from most proximal plant row 400, but also from the more distal rows that are obscured by the proximal rows. A directional acoustic signal 220 having an axis of direction schematically represented by line 225, may be oriented by AGRYbot 100 so that the axis of direction is orthogonal to the orientation of the plant rows. By way of example, respective central axes of rows 400 and 410, as well as the respective central axes of rows 420 and 430 are separated by approximately 0.5 m. The respective central axes of rows 410 and 420 are separated by a larger gap of approximately 1 m.

Figure 5B:
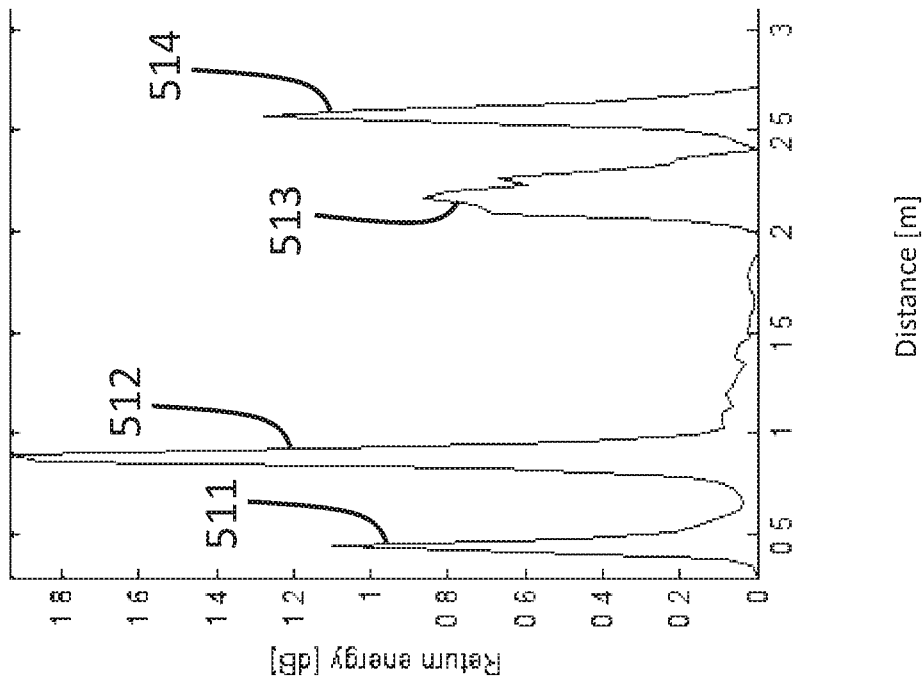
FIGS. 5A-5B show examples of analysis of registered acoustic signals.
Figure 5A:
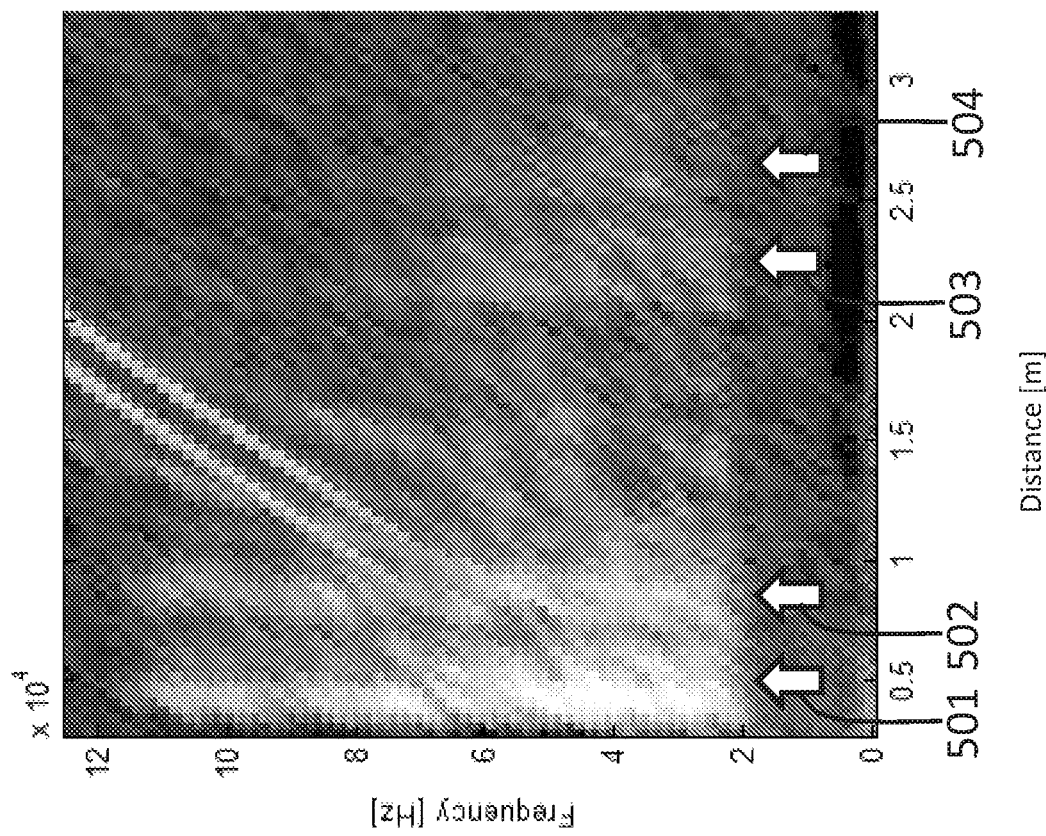

FIG. 5A shows a straightened spectrogram of a return chirp that is a reflection of a chirp signal having a frequency range of 20 kHz to 120 kHz directed orthogonally against rows of pepper plants, arranged substantially in the same arrangement as rows 400, 410, 420 and 430 as shown in FIG. 4. The x-axis has been converted from time to distance (in meters) according to formula (1). The distance indicates distance from sensor module 120, as schematically shown in FIG. 4, receiving the return chirp. The transmitted chirp has been cropped so that it does not appear in the spectrogram. As indicated by block arrows 501, 502, 503 and 504, the spectrogram of the return chirp includes four clusters, respectively centered at about 0.4 m, 0.9 m, 2.2 m and 2.6 m (measured from the microphone), which corresponds to the arrangement of the scanned plant rows.

FIG. 5B is an alternative representation of the spectrogram shown in FIG. 5A, showing the distance weighted sum of energy (in decibels—dB) of the return chirp according to distance (in meters) from microphone 124. The weighted sum of energy was calculated in the following manner: the sound registered by the microphone was "cleaned" to reduce noise; each pixel representing the return chirp in the spectrogram was normalized by dividing the amplitude of a given pixel with its respective decay rate, which decay rate is dependent on distance traveled as well as frequency; and amplitudes of pixels at each time point were summed. In accordance with an embodiment of the disclosure, only pixels within a defined range of frequencies are summed in order to provide sharper peaks.

Optionally, as with the trace shown in FIG. 5B, pixel amplitude is normalized to account for atmospheric attenuation in accordance with the formula $$A_{weighted}(x, f) = \frac{A(x, f)}{e^{-\alpha(f) \cdot x}} \quad (2)$$

wherein A(x, f) represents the measured amplidute of a given pixel of sound having a frequency f reflected from distance x, $e^{-\alpha(f) \cdot x}$ represents the atmospheric decay rate that is dependent on frequency f and distance x, and $A_{weighted}$(x, f) represents the weighted amplitude for the given pixel. Additionally or alternatively, pixel amplitude is normalized to account for geometric attenuation. Optionally, the summation of pixels is limited to pixel within a define frequency range. Optionally, the frequency range for pixel summation may be between about 40 kHz and about 60 kHz, between about 30 kHz and about 70 kHz, between about 20 kHz and about 80 kHz, between about 20 kHz and about 100 kHz, or between about 20 kHz and about 120 kHz. Advantageously, as with the trace shown in FIG. 5B, pixels within the frequency range of between 40 kHz and 60 kHz are summed. The resulting trace of return energy against distance shows four main peaks 511, 512, 513 and 514 that correspond to the clusters identified by block arrows 501, 502, 503 and 504 in the spectrogram shown in FIG. 5A.

Figure 6B:
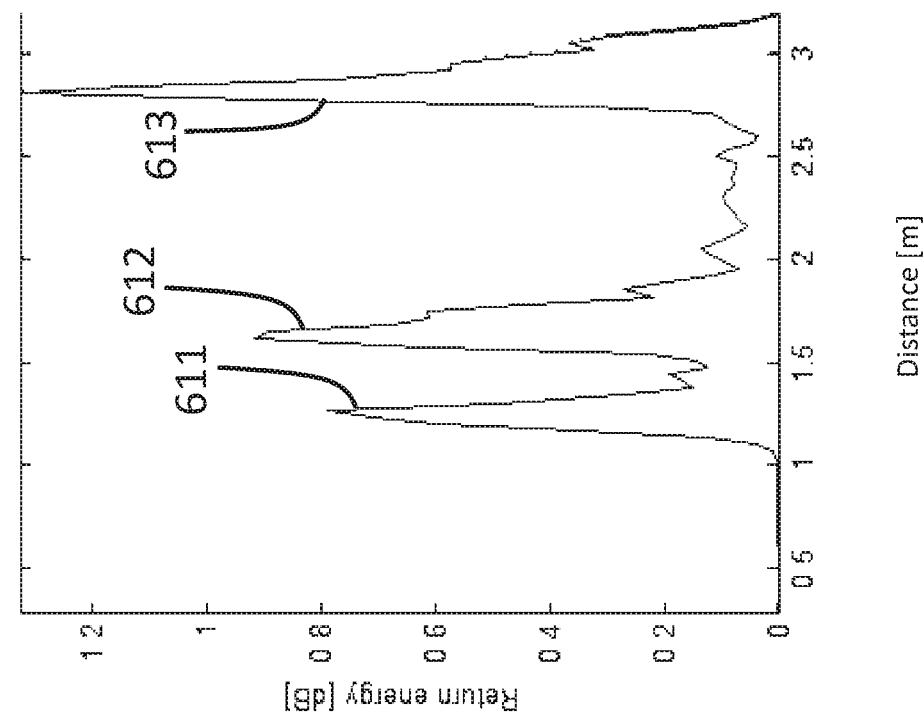
FIGS. 6A-6B show examples of analysis of registered acoustic signals.
Figure 6A:
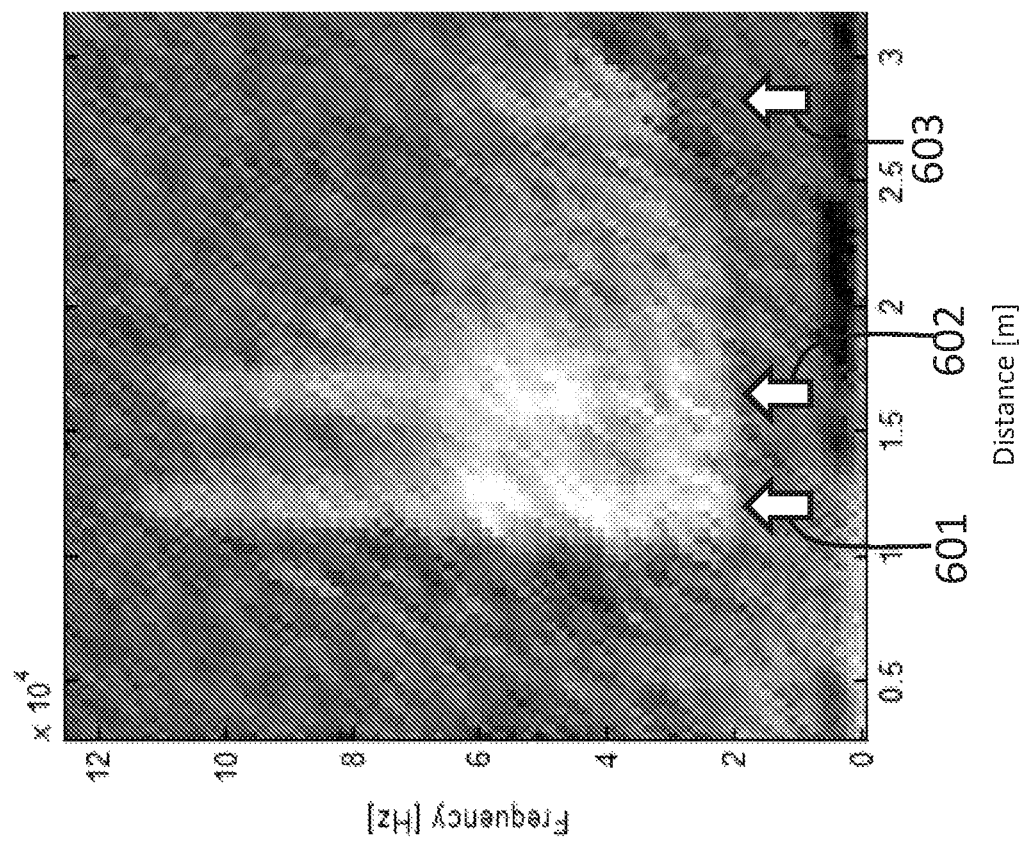

FIGS. 6A-B shows similar spectrograms as those shown, respectively, in FIGS. 5A-5B, in which the microphone is about 1.25 m away from the most proximal plant row. As indicated by block arrows 601, 602 and 603, the spectrogram of the return chirp includes 3 clusters, respectively centered at about 1.25 m, 1.7 m, and 2.8 m (measured from the microphone). The trace of return energy against distance shows three main peaks 611, 612, 613 that correspond to the clusters identified by block arrows 601, 602, 603 in the spectrogram shown in FIG. 6A. In the case shown in FIGS. 6A-6B where the speaker and the microphone were farther away from the plant rows being scanned, there was no return chirp sufficiently above noise reflected from the plant row detected as cluster 504 in FIG. 5A and peak 514 in FIG. 5B, for example due to increased attenuation of the chirp signal.

In an embodiment of the disclosure, the spectrogram of return chirps may by analyzed by the sound analyzer to determine when the orientation of the sensor module, and thus the direction of transmission of the acoustic signal 220 transmitted from speaker 122, is substantially orthogonal to the orientation of the plant row. The sharpness of how the walls appear in the spectrogram, as well as the apparent width of the plant rows as shown in the spectrogram, is dependent on the angle of incidence of the acoustic signal. When the axis of direction of the acoustic signal strikes the plant rows at a non-orthogonal angle, the plant rows will appears wider and farther apart. Thus, robotic manipulator 140 may control the yaw and optionally pitch of the sensor module so that acoustic scans at multiple directions are made, and the orientation of the acoustic signal's axis of direction may be determined to be orthogonal to the orientation of the plant rows when the plant rows appear to be of minimal distance from the microphone as well as each other, and have minimal width.

Figure 7:
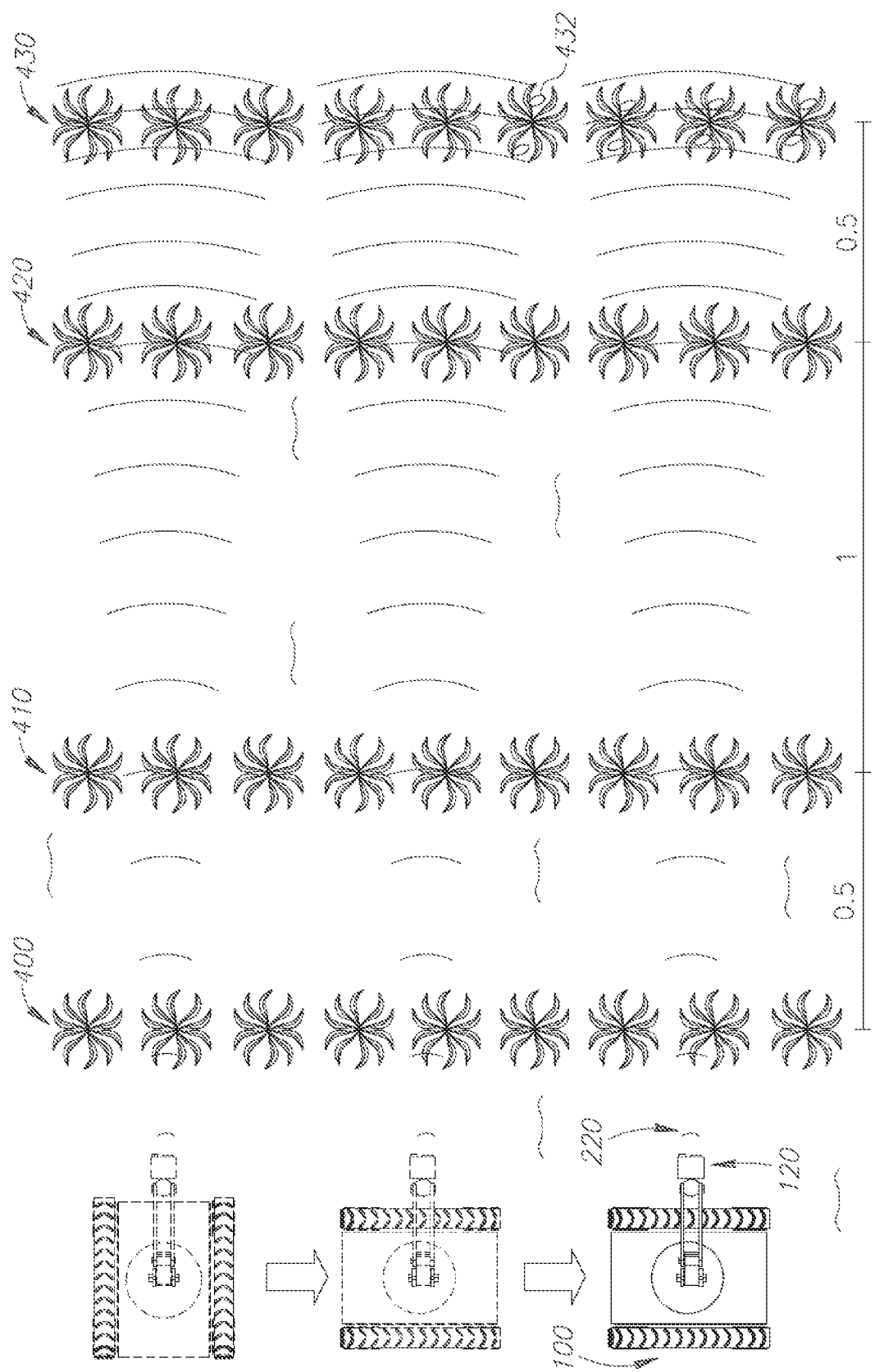
FIG. 7 shows a schematic illustration of an AGRYbot in accordance with an embodiment of the disclosure moving through an agricultural field.

Reference is now made to FIG. 7, which schematically shows an overhead view of AGRYbot 100 moving through an agricultural field with rows of plants 400, 410, 420 and 430, some of the plants in row 430 having fruit 432. In an embodiment of the disclosure, spatial information on the surrounding environment gleaned by the sound analyzer from returned signals may be used by guidance system 164 to guide the movement of autonomous vehicle 160. In an embodiment of the disclosure, guidance system 164 may be operable to control AGRYbot 100 to move towards or avoid an object mapped by the sound analyzer. Optionally, the spatial information gleaned by the sound analyzer includes an orientation of plant rows and a distance of plant rows from microphone 124 on sensor module 120. By way of example, as shown in FIG. 7, guidance system 164 may guide the autonomous vehicle to move in a direction parallel to the orientation of the proximal plant row, keeping the autonomous vehicle at a substantially constant distance from the proximal plant row, so that AGRYbot 100 can scan plants along the length of the plant rows. In an embodiment of the disclosure, spatial information on the surrounding environment gleaned by the sound analyzer may be used by controller 141 (as shown in FIG. 1D) to guide the movement of robotic manipulator 140. Optionally, controller 141 is operable to control manipulator 140 to move towards or avoid an object mapped by the sound analyzer. Optionally, controller 141 is further responsive to movement of autonomous vehicle 160. By way of example, if autonomous vehicle 160 makes turns while traveling along the plant row, or if the pitch, yaw or roll of the autonomous vehicle is affected by terrain, the controller may use information provided by guidance system 164 and the sound analyzer to control robotic manipulator 140 to compensate for the movement of the autonomous vehicle. The compensation may keep the orientation and distance of sensor module 120 to the plant rows constant so that the distance of speaker 122 remains constant to the plant rows, and the axis of direction of sound signals 220 emitted from speaker 122 remains orthogonal, or at any other predetermined angle, in relation to the orientation of the plant rows.

Figure 8:
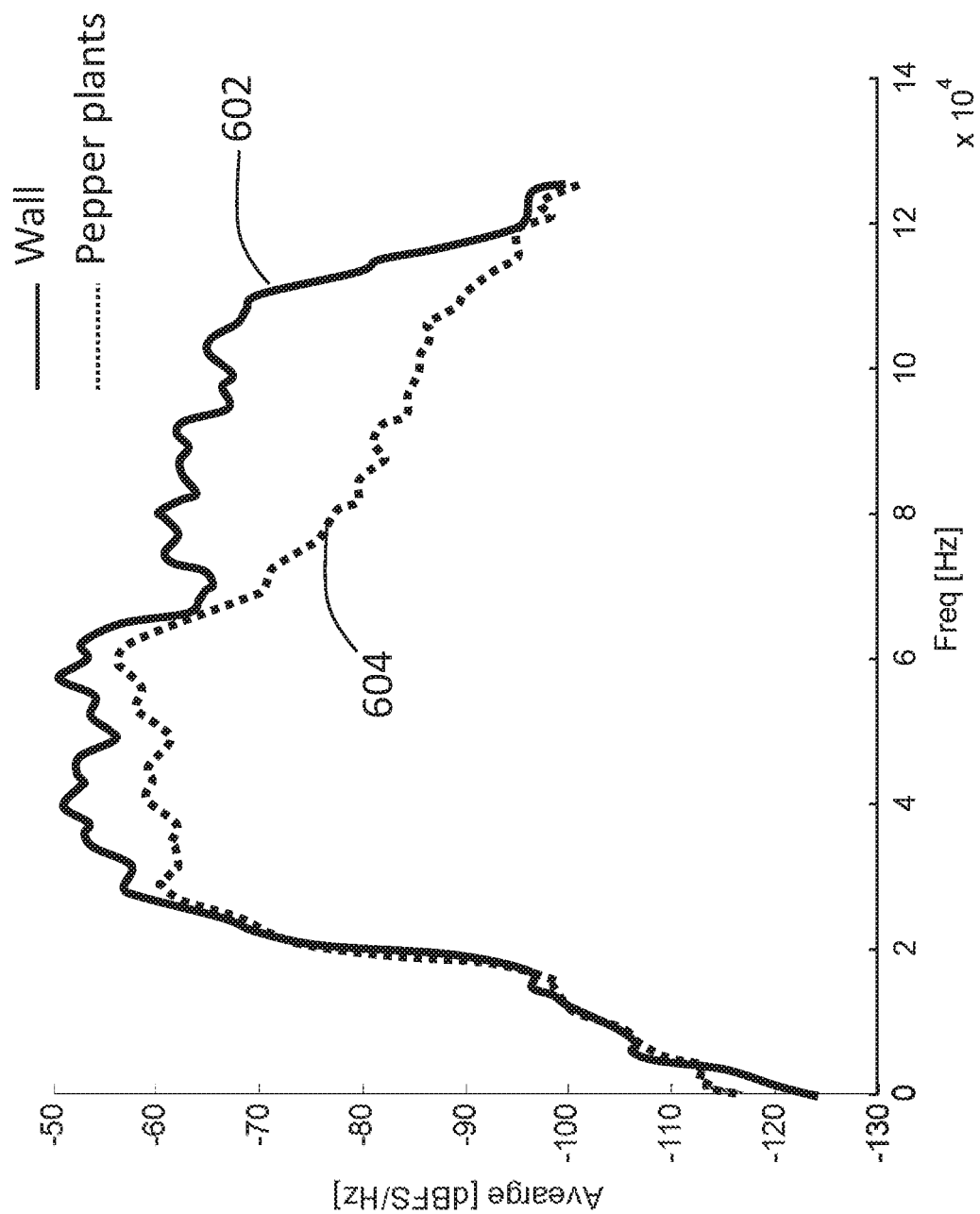
FIGS. 8 and 9 show examples of classification of objects represented in registered return signals.
Figure 9:
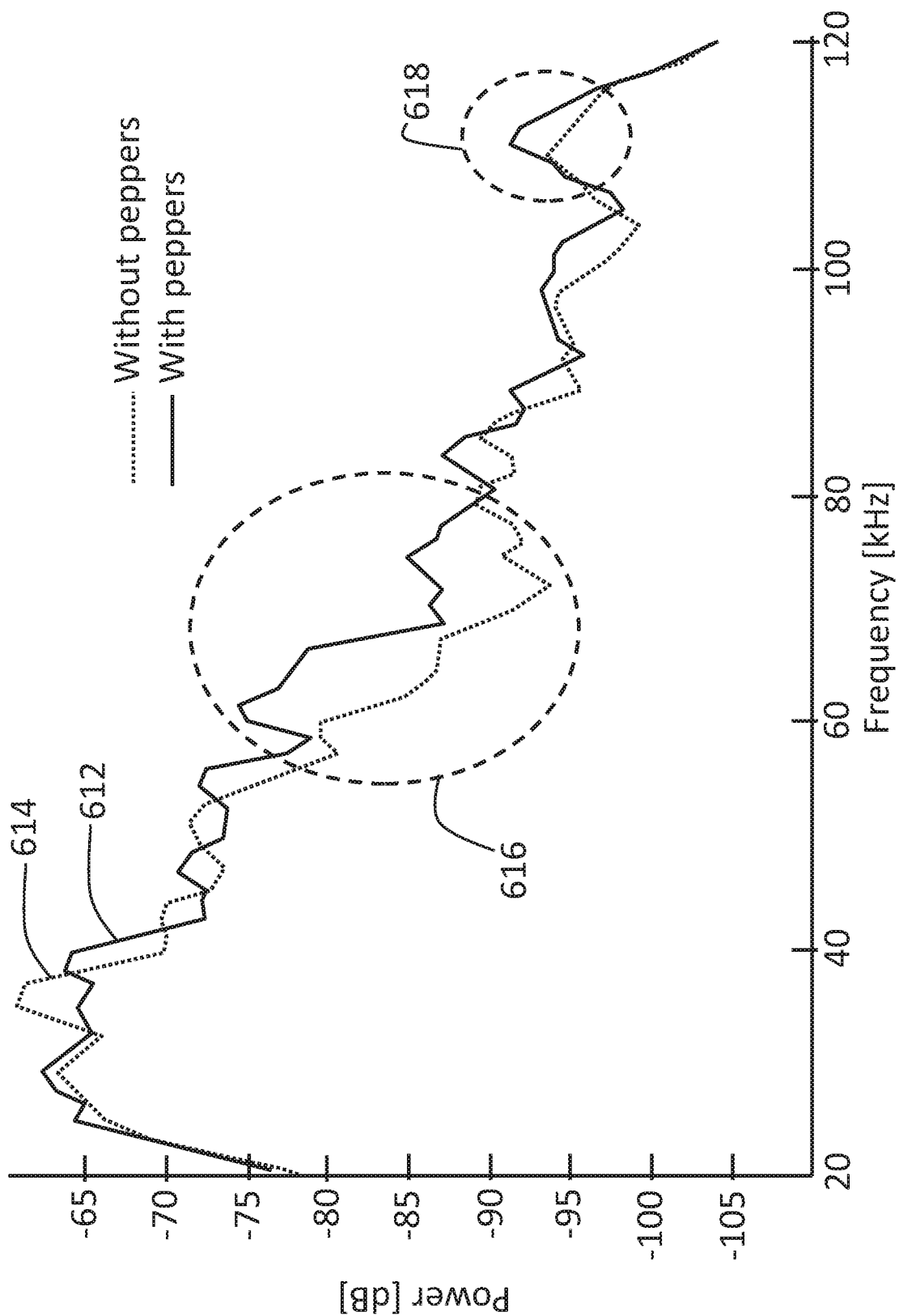

Reference is now made to FIGS. 8 and 9. In an embodiment of the disclosure, the classifier (by way of example classifier 180 as shown in FIG. 1D) may receive time-indexed sound signals from the sound analyzer (by way of example sound analyzer 170 as shown in FIG. 1D) to characterize features in the environment that reflects the acoustic signals transmitted by the AGRYbot. Optionally, the classifier may distinguish between a plant and a non-plant, such as an embankment of earth, a wall of a greenhouse, or another AGRYbot. Optionally, the classifier may distinguish between different classifications of an agricultural plant scanned by acoustic sensor module 120, such as variety of plant; presence of fruit on the plant; the abundance of fruit on the plant; the ripeness of the fruit; the level of health of the plant; the abundance of branches on the plant; the abundance of foliage on the plant, or the level of pest infestation on the plant.

In an embodiment of the disclosure, the classifier may characterize objects reflecting a return chirp by converting a spectrogram of the return chirp into a frequency domain representation that expresses intensity of the return chirp (y-axis) in terms of the frequencies (x-axis) that make up the return chirp. Differences in material properties and shape of objects may result in differences in how certain frequencies of an acoustic signal are reflected. In turn, differences in the sound-reflection properties of different object may be expressed as differences in intensity of particular ranges of frequencies represented in the return chirp. Frequency-dependent differences in sound-reflective properties may be effectively detected in a frequency domain representation.

By way of example, FIG. 8 shows exemplary frequency domain representations of return chirps reflected, respectively, from a row of pepper plants and a greenhouse wall. Dotted line 604 represents the return chirp from the row of pepper plant, and solid line 602 represents the return chirp form the greenhouse wall. The acoustic signals directed at the pepper plants or the greenhouse wall were substantially identical multispectral acoustic signals having frequencies ranging from 20 to 120 kHz. The distance from the plant row or the greenhouse wall to the speaker and microphone were substantially the same. For each frequency, the amplitude of each pixel at a given frequency were converted to dBFS/Hz (decibels below full scale for the given frequency) and averaged (mean) to arrive at an averaged dBFS/Hz, and plotted against frequency. The average amplitudes of the return chirp from the greenhouse wall were generally greater than the return chirps from the plant row across the entire frequency range, and especially greater between the frequencies of 75 kHz to 105 kHz.

Reference is now made to FIG. 9, where differences in frequency domain (spectral) representations of return chirps are used to distinguish between fruit-bearing pepper plants and non-fruit-bearing pepper plants. Solid line 612 represents return chirp from a row of pepper plants with fruit, and dotted line 614 represents return chirp from a row of pepper plants without fruit. The acoustic signals directed at the respective pepper plant rows were substantially identical multispectral acoustic signals having frequencies ranging from 20 to 120 kHz. The distance from the respective pepper plant rows to the speaker and microphone were substantially the same. For each frequency, the respective amplitudes in decibels (dB) of pixels at a given frequency were averaged and plotted against frequency. Compared to return chirps from plants having no fruit, amplitudes of return chirps from plant rows having fruit were characteristically greater between the frequencies of about 60 kHz and about 80 kHz (as schematically indicated by dashed circle 616) and between the frequencies of about 110 kHz and about 115 kHz (as schematically indicated by dashed circle 618).

In an embodiment of the disclosure, the classifier may comprise a machine learning module. The machine learning module may comprise a supervised learning model that analyses a set of training data and produces an inference function that can be used to classify new examples. Optionally, the supervised learning model is a support vector machine. The training data optionally comprises actual and/or simulated return chirps associated with one or more characteristics that may be, by way of example, variety of plant; presence of fruit on the plant, the abundance of fruit on the plant, the ripeness of the fruit, the level of health of the plant, the abundance of branches on the plant, the abundance of foliage on the plant, or the level of pest infestation on the plant. The machine learning module may optionally be run on one or more features extracted from the temporal and/or spectral representations of return chirps. Optionally, the one or more return chirp features may be extracted through dimensionally reducing the return chirps' feature space, by way of example by using a principal component analysis (PCA).

Figure 10A:
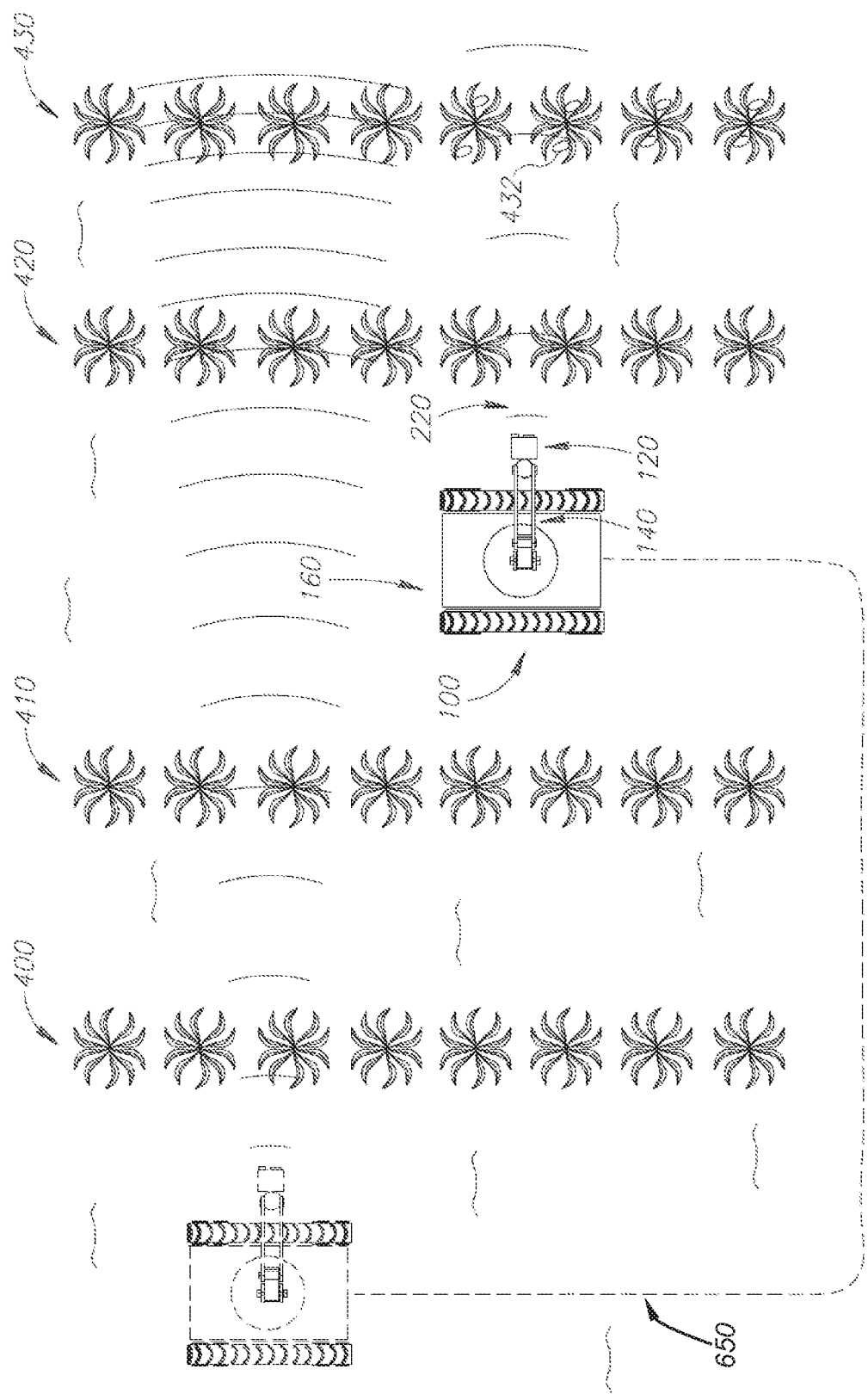
FIGS. 10A and 10B show schematic illustrations of an AGRYbot in accordance with an embodiment of the disclosure moving through an agricultural field to identify a plant having fruit.
Figure 10B:
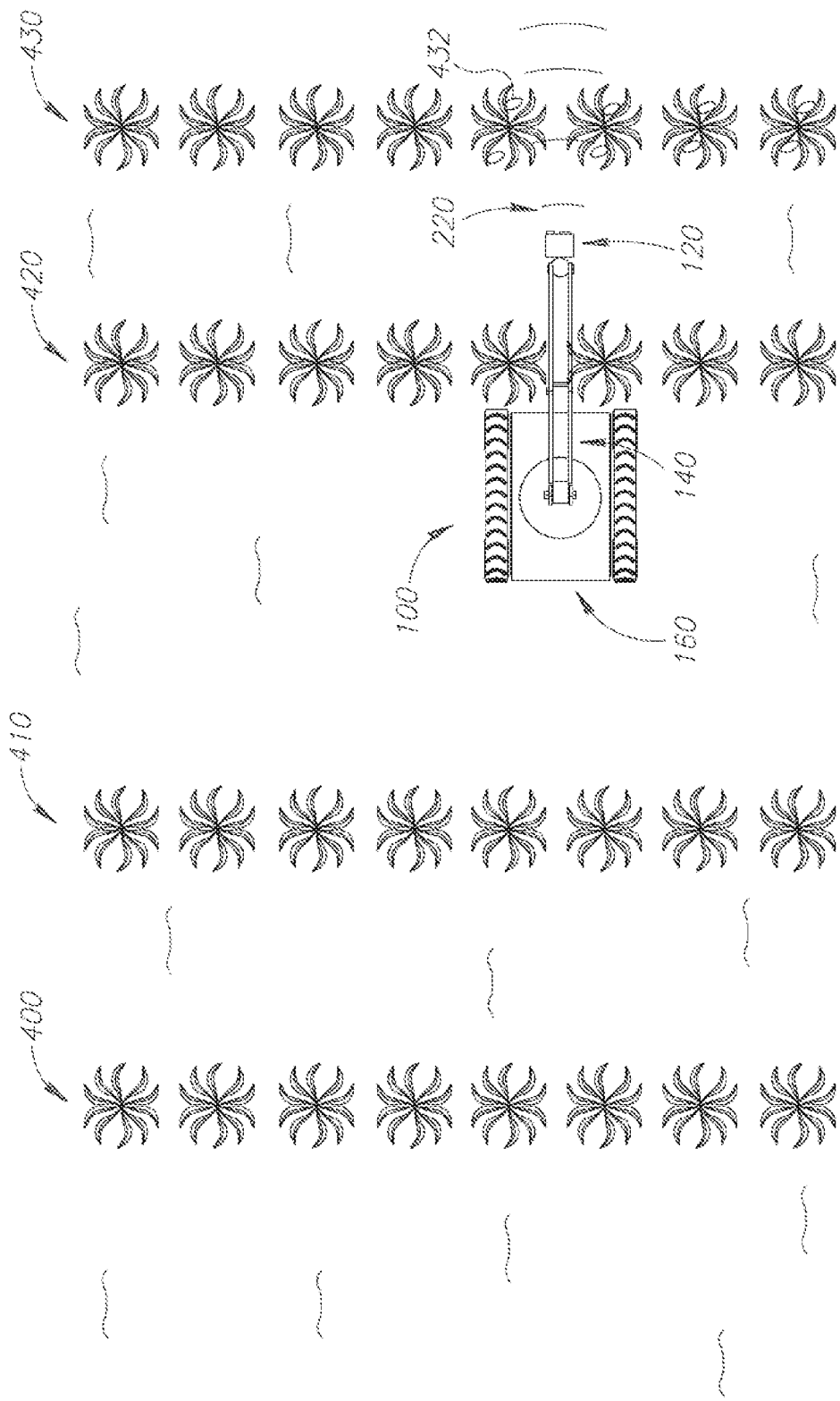

Reference is now made to FIGS. 10A-10B, which schematically shows an overhead view of AGRYbot 100 moving through an agricultural field with rows of plants 400, 410, 420 and 430 as shown in FIG. 7. As shown in FIG. 10A, AGRYbot 100 moves (as indicated by dotted line 650) alongside the plant rows scanning the plants, with the classifier classifying the registered return sound to identify plants with fruit. As shown in FIG. 10B, once a classifier (by way of example classifier 180 as shown in FIG. 1D) comprised in AGRYbot 100 determined that certain plants have fruit 432, the AGRYbot may activate robotic manipulator 140 and/or autonomous robot 160 to move sensor module 120 closer to the plants having fruit 432 to optionally perform additional acoustic scans and/or to assess a given plant or a given fruit for ripeness. By way of example, AGRYbot 100 may assess ripeness through one or a combination of methods, including: evaluating return chirps returning from fruit 432 with classifier 180; capturing light reflected from fruit 432 with a camera (not shown) housed in sensor module 120; evaluating fruit 432 with a chemical sensor (not shown) housed in sensor module 120; or touching fruit 432 with a proboscis (by way of example proboscis 126 as shown in FIG. 1C) housed in sensor module 120 to evaluate, by way of example, hardness of fruit 432.

Reference is now made to FIG. 10C. In an embodiment of the disclosure, the sound analyzer (by way of example sound analyzer 170 as shown in FIG. 1D) gathers spatial information provided by the acoustic scans to create a map of the environment. As AGRYbot 100 moves through the environment and scan additional areas of the environment with acoustic signals 220, the map may be expanded and/or updated. FIG. 10C schematically shows a graphic representation of a map 700 of a portion of the agricultural field scanned by AGRYbot 100, which corresponds to the agricultural field portion shown in FIGS. 10A-10B. By way of example, map 700 comprises regions 710, 711, 712 and 713 that mark the locations of plant rows 400, 410, 420 and 430, respectively, detected through acoustic signal transmitted and registered by AGRYbot 100. Region 713 comprises sub-region 720 that marks the location of plants that have fruit 432, optionally fruit that is ready for harvest, as determined by the classifier comprised in the sound analyzer (by way of example classifier 180 as shown in FIG. 1D). In an embodiment of the disclosure, AGRYbot 100 may navigate a mapped environment through dead reckoning without acoustic or optic input, using, by way of example, an odometer, accelerometer and/or a digital compass.

Figure 11:
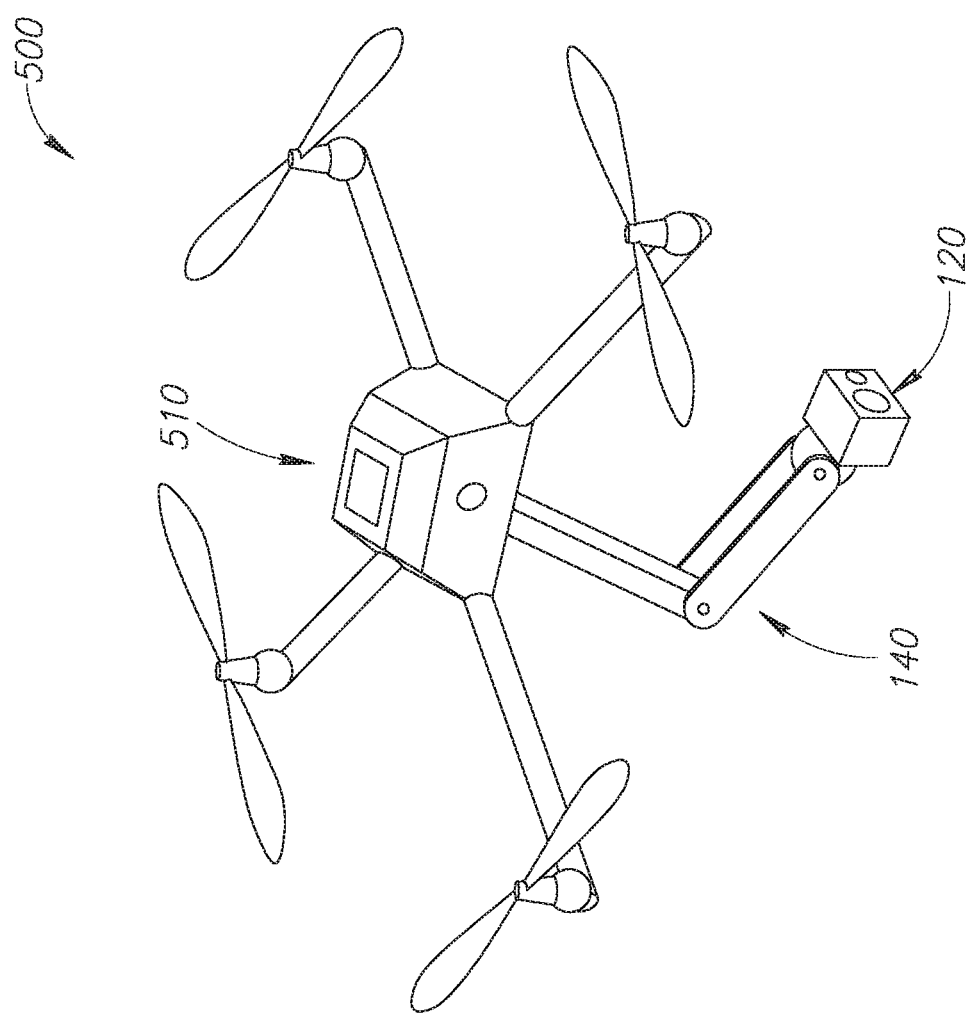
FIG. 11 shows a schematic illustration of an aerial AGRYbot in accordance with an embodiment of the disclosure.

Reference is now made to FIG. 11, which schematically shows an alternative AGRYbot 500 in accordance with an embodiment of the disclosure. AGRYbot 500 comprises a sensor module 120 that is substantially the same as sensor module 120 described hereinabove with reference to AGRYbot 100. In the present embodiment, sensor module 120 is mounted onto an aerial vehicle 510. Optionally, sensor module 120 is mounted onto aerial vehicle 510 via a robotic manipulator 140 that is substantially the same as manipulator 140 described hereinabove with reference to AGRYbot 100. Whereas aerial vehicle 510 as shown in FIG. 11 is a quadcopter-style aircraft, aerial vehicle 510 may be other types of aircraft. Optionally, aerial vehicle 510 is a helicopter-style aircraft or an airplane-styleaircraft. Aerial AGRYbots 500 may be advantageously used to monitor agricultural fields with relatively tall plants, by way of example date palms, in which it may be relatively challenging for a ground AGRYbot 100 to direct a sensor module 120 to be sufficiently close to foliage and fruits located relative high off the ground. Alternatively or additionally, aerial AGRYbot 500 may advantageously execute an overhead acoustic signal scan of an agricultural field.

Figure 12:
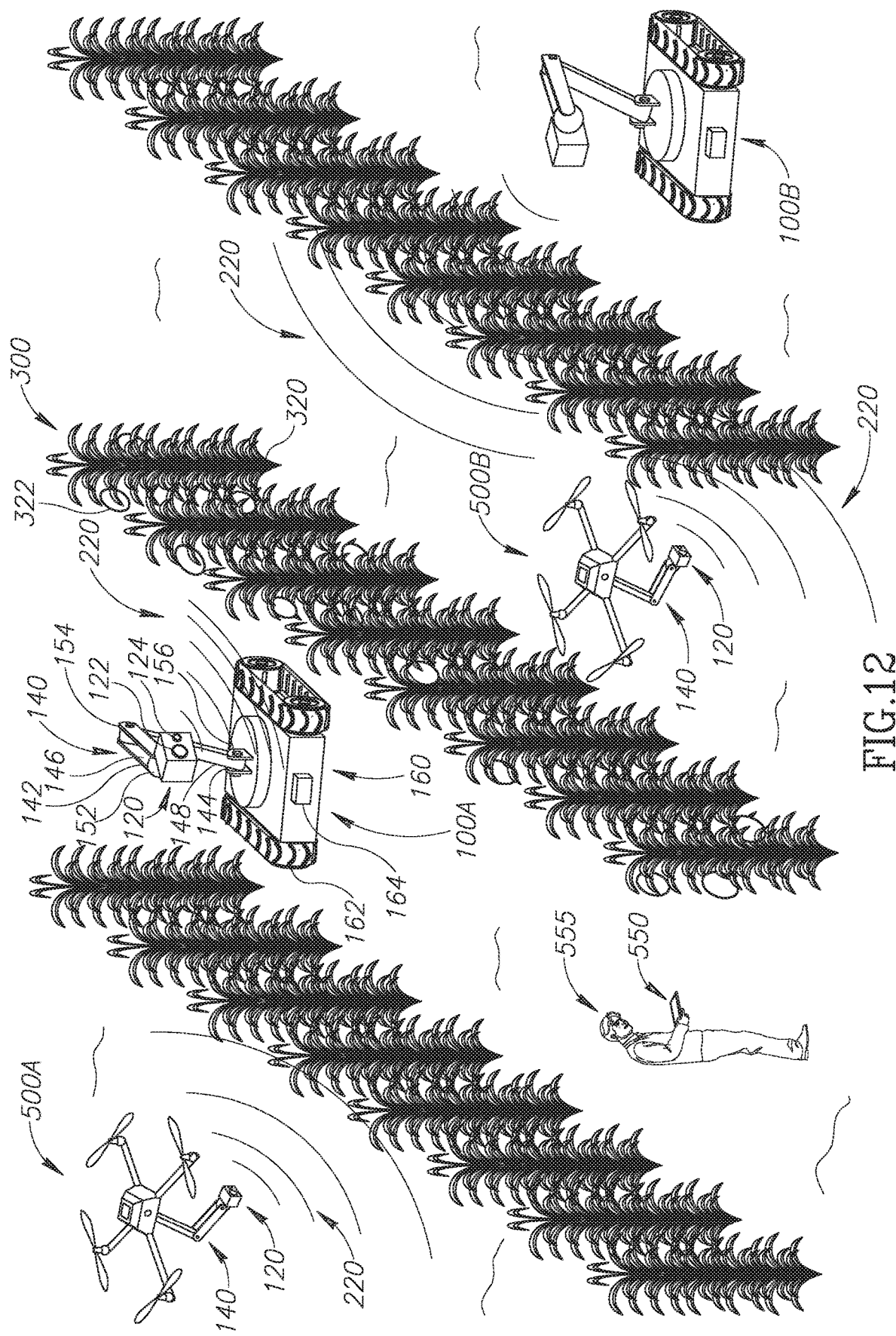
FIG. 12 shows a schematic illustration of a team of AGRYbots in accordance with an embodiment of the disclosure.

FIG. 12 shows a schematic illustration of a team of AGRYbots, two aerial AGRYbots 500A, 500B and two ground AGRYbots 100A, 100B, in accordance with embodiments of the disclosure, in an agricultural field comprising rows 300 of plants 320. In an embodiment of the disclosure, multiple AGRYbots are operable to coordinate their actions in order to monitor the agricultural field more efficiently and/or accurately. Optionally the AGRYbots of the AGRYbot team are operable to coordinate their actions through a central control unit 550 comprising a speaker and a microphone. Central control unit 550 optionally comprises a computer device for use by a user 555, such as a laptop computer, a mobile phone or a tablet computer. Optionally, central control unit 550 comprises a speaker and microphone operatively connected, via a wired or wireless connection, to a remote computing device, server or a network-distributed (cloud) server.

In an embodiment of the disclosure, the AGRYbots may communicate with each other by transmitting and receiving acoustic signal through their respective sensor modules 120. Optionally, the acoustic communication signals comprise operational instructions for an AGRYbot. Additionally or alternatively, the acoustic communication signal comprises information gathered by a AGRYbot regarding the agricultural field being monitored, and information gathered by the AGRYbot is transferred to another AGRYbot through transmission and reception, between respective sensor modules 120. Optionally, the exchange of acoustic communication signals is used in addition, or as an alternative, to other wireless communication means as described hereinabove that may be comprised in the AGRYbots. In an embodiment of the disclosure, an AGRYbot of the AGRYbot team may exchange acoustic communication signals with central control unit 550. In an embodiment of the disclosure, central control unit 550 may maintain a centralized map based on a combination of information regarding the growing site gathered by the AGRYbot team.

By way of example, two ground AGRYbots 100A and 100B may start scanning the same agricultural field from opposite sides, creating a map of the agriculture field. Once they get sufficiently close to exchange acoustic signals with each other, each AGRYbot may transmit respective portions of the map so that each AGRYbot has a complete map of the field.

By way of another example each of AGRYbots 100A and 100B may scan overlapping portions of the field, and the maps created by a respective sound analyzer 170 in each AGRYbot may be transferred to each other, and the respective maps may be combined to create a more accurate map.

By way of another example, aerial AGRYbot 500 may create an overhead map of rows 300 in the agricultural field, then fly to each of ground AGRYbots 100A and 100B to transfer the overheard map to the ground AGRYbots.

In an embodiment of the disclosure, the AGRYbots are operable to use acoustic signals to find and locate each other in the field. Optionally, when a first AGRYbot conducts an acoustic scan of a portion of the field occupied by a second AGRYbot, and the reflected acoustic signals received by the first AGRYbot comprises reflections from the second AGRYbot, classifier 180 may be operable to distinguish between the second AGRYbot and plant rows, and map the location of the second AGRYbot in the field. The location of the second AGRYbot in the scanned field portion as determined by the acoustic analysis conducted by the first AGRYbot may be advantageously used in addition, or as an alternative, to the second AGRYbot's self-tracking of location by other means including but not limited to GPS receivers, odometers, and inertial measurement units (IMU) that are optionally comprised in the second AGRYbot. Tracking of other AGRYbots in a field using acoustic scanning may be used in addition, or as an alternative, to tracking using a camera and/or LADAR. Tracking other AGRYbots with acoustic scanning may be advantageous over camera or LADAR-based tracking in environments like an agricultural field, which typically has many plants and other items that may obscure light signals more severely than acoustic signals that more readily penetrate foliage.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the disclosure in the present application are provided by way of example and are not intended to limit the scope of the disclosure. The described embodiments comprise different features, not all of which are required in all embodiments of the disclosure. Some embodiments utilize only some of the features or possible combinations of the features. Variations of embodiments of the disclosure that are described, and embodiments of the disclosure comprising different combinations of features noted in the described embodiments, will occur to persons of the art. The scope of the disclosure is limited only by the claims.

The invention claimed is:

1. An agricultural robot for monitoring a growing site, the agricultural robot comprising:
   a dual mode acoustic sensor module comprising:
      a speaker operable to transmit an acoustic signal at an object and operable to transmit an acoustic communication signal for reception by another agricultural robot; and
      a microphone operable to register a reflection of the acoustic signal from at least one plant in the growing site and operable to receive the acoustic communication signal;
   a dual mode sound analyzer that is:
      operable in an echolocation mode to direct the speaker to transmit the acoustic signal wherein a frequency of the acoustic signal increases and/or decreases as a function of time, time-index the registered reflection, and map a location in the growing site of the at least one plant responsive to the registered reflection, and
      operable in a communication mode to direct the dual mode acoustic sensor module to transmit and/or receive the acoustic communication signal;
   an autonomous mobile platform; and
   an articulated robotic arm comprising a first end and a second end, the first end physically connected to the acoustic sensor module and the second end physically connected to the autonomous mobile platform.

2. The agricultural robot according to claim 1, wherein the articulated robotic arm provides at least three degrees of freedom movement for the acoustic sensor module.

3. The agricultural robot according to claim 2, wherein the articulated robotic arm provides six degrees of freedom movement for the acoustic sensor module.

4. The agricultural robot according to claim 1, wherein the autonomous mobile platform is a ground vehicle.

5. The agricultural robot according to claim 1, wherein the autonomous mobile platform is an aerial vehicle.

6. The agricultural robot according to claim 1, wherein the sound analyzer comprises a classifier that classifies the time-index of the registered reflection to determine a characteristic of the object reflecting the acoustic signal.

7. The agricultural robot according to claim 6, wherein the classifier is operable to distinguish between a plant object and a non-plant object.

8. The agricultural robot according to claim 7, wherein the object is a plant, and the characteristic of the object operable to be determined by the classifier comprises one or more selections of the group consisting of: variety of the plant; the plant having fruit or not having fruit; the abundance of fruit on the plant; the ripeness of fruit on the plant; the level of health of the plant; the abundance of branches on the plant; the abundance of foliage on the plant, and the level of pest infestation on the plant.

9. The agricultural robot according to claim 1, wherein the frequency changes linearly over time.

10. The agricultural robot according to claim 1, wherein a power of the acoustic signal stays constant over time.

11. The agricultural robot according to claim 1, wherein the acoustic communication signal comprises an operational instruction for the another agricultural robot.

12. The agricultural robot according to claim 1, wherein the acoustic communication signal comprises information regarding the growing site gathered by the agricultural robot.

13. The agricultural robot according to claim 1, wherein the acoustic communication signal comprises a location of the another agricultural robot in the growing site.

14. The agricultural robot according to claim 1, further comprising a guidance system operable to control the autonomous mobile platform responsive to the location in the growing site of the at least one plant located responsive to the registered reflection.

15. A multirobot system for monitoring a growing site, the multirobot system comprising a plurality of agricultural robots in accordance with claim 1, the plurality of agricultural robots comprising at least a first agricultural robot and a second agricultural robot, wherein the sound analyzer comprised in the first agricultural robot is operable to control the first agricultural robot responsive to receiving from the second agricultural robot an acoustic communication signal that comprises information regarding locations of objects in a portion of the growing site gathered by the second agricultural robot.

16. The multirobot system according to claim 15, wherein the first agricultural robot has not previously gathered information in the portion of the growing site.

17. The multirobot system according to claim 15, wherein the first agricultural robot has previously gathered information in the portion of the growing site, and the sound analyzer of the first agricultural robot is operable to combine the respective information regarding the portion of the growing site gathered by the first and second agricultural robots to generate more accurate information regarding object location in the portion of the growing site.

18. The agricultural robot according to claim 1, further comprising a controller operable to control the articulated robotic arm responsive to the location in the growing site of the at least one plant located responsive to the registered reflection.

19. The agricultural robot according to claim 18, wherein the acoustic sensor module is connected to the articulated robotic arm, such that the controller is operable to control the articulated robotic arm to move the acoustic sensor module.

* * * * *